United States Patent
Rupela et al.

(10) Patent No.: US 11,989,201 B2
(45) Date of Patent: *May 21, 2024

(54) GENERATING VARIED-SCALE VISUALIZATIONS OF MULTI-DIMENSIONAL DATA

(71) Applicant: Adobe Inc., San Jose, CA (US)

(72) Inventors: Akash Rupela, Rohini (IN); Piyush Gupta, Noida (IN); Nupur Kumari, Noida (IN); Bishal Deb, Digboi (IN); Balaji Krishnamurthy, Noida (IN); Ankita Sarkar, Barddhaman (IN)

(73) Assignee: Adobe Inc., San Jose, CA (US)

( * ) Notice: Subject to any disclaimer, the term of this patent is extended or adjusted under 35 U.S.C. 154(b) by 228 days.

This patent is subject to a terminal disclaimer.

(21) Appl. No.: 17/383,009

(22) Filed: Jul. 22, 2021

(65) Prior Publication Data
US 2021/0349915 A1  Nov. 11, 2021

Related U.S. Application Data

(63) Continuation of application No. 16/368,415, filed on Mar. 28, 2019, now Pat. No. 11,100,127.

(51) Int. Cl.
*G06F 16/22* (2019.01)
*G06F 3/0481* (2022.01)
(Continued)

(52) U.S. Cl.
CPC ............ *G06F 16/26* (2019.01); *G06F 3/0481* (2013.01); *G06F 16/2264* (2019.01);
(Continued)

(58) Field of Classification Search
CPC .... G06F 16/26; G06F 3/0481; G06F 16/2264; G06F 16/248; G06F 16/283; G06F 18/213; G06F 18/2137
See application file for complete search history.

(56) References Cited

U.S. PATENT DOCUMENTS 6,154,213 A * 11/2000 Rennison ............... G06F 16/34
707/E17.093
9,208,257 B2 * 12/2015 Milenova ............... G06F 16/35
(Continued)

FOREIGN PATENT DOCUMENTS

WO    WO 2018-027180 A1    2/2018
WO    WO-2018027180 A1 *  2/2018  ......... G01R 19/2503

OTHER PUBLICATIONS

[Ayasdi, 2015] Ayasdi, I. (2015). Clinical variation management with advanced analytics.
(Continued)

*Primary Examiner* — Roberto Borja
(74) *Attorney, Agent, or Firm* — Keller Preece PLLC

(57) ABSTRACT

This disclosure relates to methods, non-transitory computer readable media, and systems that generate and render a varied-scale-topological construct for a multidimensional dataset to visually represent portions of the multidimensional dataset at different topological scales. In certain implementations, for example, the disclosed systems generate and combine (i) an initial topological construct for a multidimensional dataset at one scale and (ii) a local topological construct for a subset of the multidimensional dataset at another scale to form a varied-scale-topological construct. To identify a region from an initial topological construct to vary in scale, the disclosed systems can determine the relative densities of subsets of multidimensional data corresponding to regions of the initial topological construct and select one or more such regions to change in scale.

20 Claims, 12 Drawing Sheets

(51) Int. Cl.
| | |
|---|---|
| *G06F 16/248* | (2019.01) |
| *G06F 16/26* | (2019.01) |
| *G06F 16/28* | (2019.01) |
| *G06F 18/213* | (2023.01) |
| *G06F 18/2137* | (2023.01) |

(52) U.S. Cl.
CPC .......... *G06F 16/248* (2019.01); *G06F 16/283* (2019.01); *G06F 18/213* (2023.01); *G06F 18/2137* (2023.01)

(56) References Cited

U.S. PATENT DOCUMENTS

| | | | | |
|---|---|---|---|---|
| 9,911,211 | B1* | 3/2018 | Damaraju | G06F 16/9024 |
| 2004/0090472 | A1* | 5/2004 | Risch | G06F 16/34 |
| | | | | 707/E17.093 |
| 2005/0182764 | A1* | 8/2005 | Evans | G06T 11/206 |
| | | | | 707/999.005 |
| 2011/0249002 | A1* | 10/2011 | Duplessis | G06T 11/206 |
| | | | | 345/440 |
| 2013/0222388 | A1* | 8/2013 | McDonald | G06F 16/9024 |
| | | | | 345/440 |
| 2013/0249812 | A1* | 9/2013 | Ramos | G01C 21/367 |
| | | | | 345/589 |
| 2015/0269243 | A1* | 9/2015 | Kobayashi | G06F 16/285 |
| | | | | 707/737 |
| 2016/0246468 | A1* | 8/2016 | Harrower | G01C 21/3867 |
| 2017/0286565 | A1* | 10/2017 | Brave | G06F 16/2458 |
| 2017/0323028 | A1* | 11/2017 | Jonker | G06F 16/9024 |
| 2018/0025073 | A1* | 1/2018 | Singh | G06F 16/26 |
| | | | | 707/738 |
| 2019/0101402 | A1* | 4/2019 | Chien | G01C 21/3682 |

OTHER PUBLICATIONS

[Ayasdi, 2016] Ayasdi, I. (2016). Machine intelligence for financial services.
[Ayasdi, 2017] Ayasdi, I. (2017). Tda and machine learning: Better together.
[Ayasdi, 2018] Ayasdi, I. (2018). Understanding ayasdi: What we do, how we do it, why we do it.
[Beckham, 2012] Beckham, J. (2012). Analytics reveal 13 new basketball positions.
[Carri et al.,] Carri, M., Michel, B., Oudot, S., et al. Statistical analysis and parameter selection for mapper. Journal of Machine Learning Research, 19(12). Submitted May 2017.
[Dey et al., 2016] Dey, T. K., Memoli, F., and Wang, Y. (2016). Multiscale mapper: Topological summarization via codomain covers. In Proceedings of the twenty-seventh annual acm-siam symposium on discrete algorithms, pp. 997-1013. SIAM.
[Dheeru and Karra Taniskidou, 2017] Dheeru, D. and Karra Taniskidou, E. (2017). UCI machine learning repository.
[Ghrist, 2008] Ghrist, R. (2008). Barcodes: the persistent topology of data. Bulletin of the American Mathematical Society, 45(1):61-75.
[Hatcher, 2002] Hatcher, A. (2002). Algebraic topology. Cambridge University Press, Cambridge.
[Kamruzzaman et al., 2016] Kamruzzaman, M., Kalyanaraman, A., and Krishnamoorthy, B. (2016). Characterizing the role of environment on phenotypic traits using topological data analysis. In Proceedings of the 7th ACM International Conference on Bioinformatics, Computational Biology, and Health Informatics, pp. 487-488. ACM.
[Munch and Wang, 2016] Munch, E. and Wang, B. (2016). Convergence between categorical representations of reeb space and mapper. In 32nd International Symposium on Computational Geometry, SoCG 2016, Jun. 14-18, 2016, Boston, MA, USA, pp. 53:1-53:16.
[Pearson, 1901] Pearson, K. (1901). Principal components analysis. The London, Edinburgh, and Dublin Philosophical Magazine and Journal of Science, 6(2):559.
[Singh et al., 2007] Singh, G., Memoli, F., and Carlsson, G. E. (2007). Topological methods for the analysis of high dimensional data sets and 3d object recognition. In SPBG, pp. 91-100.
[Steen et al., 1978] Steen, L. A., Seebach, J. A., and Steen, L. A. (1978). Counterexamples in topology, vol. 18. Springer.
[Sutherland, 2009] Sutherland, W. A. (2009). Introduction to metric and topological spaces. Oxford University Press.
[Van Veen and Saul, 2017] van Veen, H. J. and Saul, N. (2017). Keplermapper.
[Vejdemo-Johansson et al., 2012] Vejdemo-Johansson, M., Carlsson, G., Lum, P. Y., Lehman, A., Singh, G., and Ishkhanov, T. (2012). The topology of politics: voting connectivity in the us house of representatives. In NIPS 2012 Workshop on Algebraic Topology and Machine Learning.
U.S. Appl. No. 16/368,415, Aug. 25, 2020, Preinterview 1st Office Action.
U.S. Appl. No. 16/368,415, Oct. 19, 2020, First Action Office Action.
U.S. Appl. No. 16/368,415, Jan. 29, 2021, Office Action.
U.S. Appl. No. 16/368,415, May 26, 2021, Notice of Allowance.

* cited by examiner

GENERATING VARIED-SCALE VISUALIZATIONS OF MULTI-DIMENSIONAL DATA

CROSS-REFERENCE TO RELATED APPLICATIONS

The present application is a continuation of U.S. application Ser. No. 16/368,415, filed on Mar. 28, 2019. The aforementioned application is hereby incorporated by reference in its entirety.

BACKGROUND

Data-visualization systems sometimes portray data in visualizations (or other graphical representations) to depict connections or patterns within or among the data. Such connections and patterns may be more readily apparent when depicted in such a data visualization. In some cases, data-visualization systems apply topological data analysis to a dataset to portray the dataset in a topological visualization. For example, data-visualizations have recently applied a Mapper algorithm to multidimensional datasets to generate simplicial complexes that visually represent corresponding multidimensional datasets.

Despite recent advances in topological visualizations, some technical limitations still impede conventional data-visualization systems from accurately executing a visualization algorithm with efficient client-device interactions, portraying connections and patterns among multidimensional data, and modifying topological visualizations of multidimensional data. In terms of client-device interactions, for example, the Mapper algorithm has proven cumbersome for client devices (and corresponding users) to perform because of the trial and error often required to fine tune combinations of parameters to generate a Mapper graph of acceptable scale.

In addition to user-interaction and user-input challenges, in some cases, conventional data-visualization systems cannot flexibly modify topological scales for a particular topological visualization. Some conventional data-visualization systems, for instance, execute the Mapper algorithm to generate a simplicial complex of a multidimensional dataset at a fixed scale for the entire dataset. To change the scale for the dataset, the data-visualization system must re-execute the Mapper algorithm with alternative parameters entered by a user into a client device. Such a fixed scale may visually obscure or misrepresent various connections or patterns in the multidimensional dataset and undermine the utility of a topological visualization.

To address the fixed-scale limitations of the Mapper algorithm, in some cases, existing data-visualization systems execute a Multiscale-Mapper algorithm that generates multiple simplicial complexes for a single multidimensional dataset at different scales. While the Multiscale-Mapper algorithm can vary scales, each of the multiple topological visualizations still portray an entire multidimensional dataset at a single scale. Accordingly, a data-visualization system can only represent the differing connections and patterns for a multidimensional dataset across multiple topological visualizations. Such multiple visualizations require additional computing resources to render and additional time for analysts to compare and contrast the multiple topological visualizations to identify connections and patterns visually from the dataset.

SUMMARY

This disclosure describes embodiments of methods, non-transitory computer readable media, and systems that solve one or more of the foregoing or other problems in addition to providing other benefits. For example, the disclosed systems can generate and render a varied-scale-topological construct for a multidimensional dataset to visually represent portions of the multidimensional dataset at different topological scales. In certain implementations, for instance, the disclosed systems generate and combine (i) an initial topological construct for a multidimensional dataset at one scale and (ii) a local topological construct for a subset of the multidimensional dataset at another scale to form a varied-scale-topological construct. To identify a region from an initial topological construct to vary in scale, the disclosed systems can determine the relative densities of subsets of multidimensional data corresponding to regions of the initial topological construct and select one or more such regions to change in scale.

For instance, in some embodiments, the disclosed systems generate an initial topological construct for a multidimensional dataset at an initial topological scale. The disclosed systems then select a region of the initial topological construct for magnification, where the region corresponds to a subset of multidimensional data from the multidimensional dataset. Based on the selection of the region, the systems generate a local topological construct for the subset of multidimensional data at an alternative topological scale. The systems then combine the local topological construct for the subset of multidimensional data with the initial topological construct for the multidimensional dataset to generate a varied-scale-topological construct for the multidimensional dataset. The systems subsequently render the varied-scale-topological construct for the multidimensional dataset.

The following description sets forth additional features and advantages of the disclosed methods, non-transitory computer readable media, and systems, and may make such additional features and advantages obvious or disclose them from the practice of exemplary embodiments.

BRIEF DESCRIPTION OF THE DRAWINGS

The detailed description refers to the drawings briefly described below.

DETAILED DESCRIPTION

Figure 1:
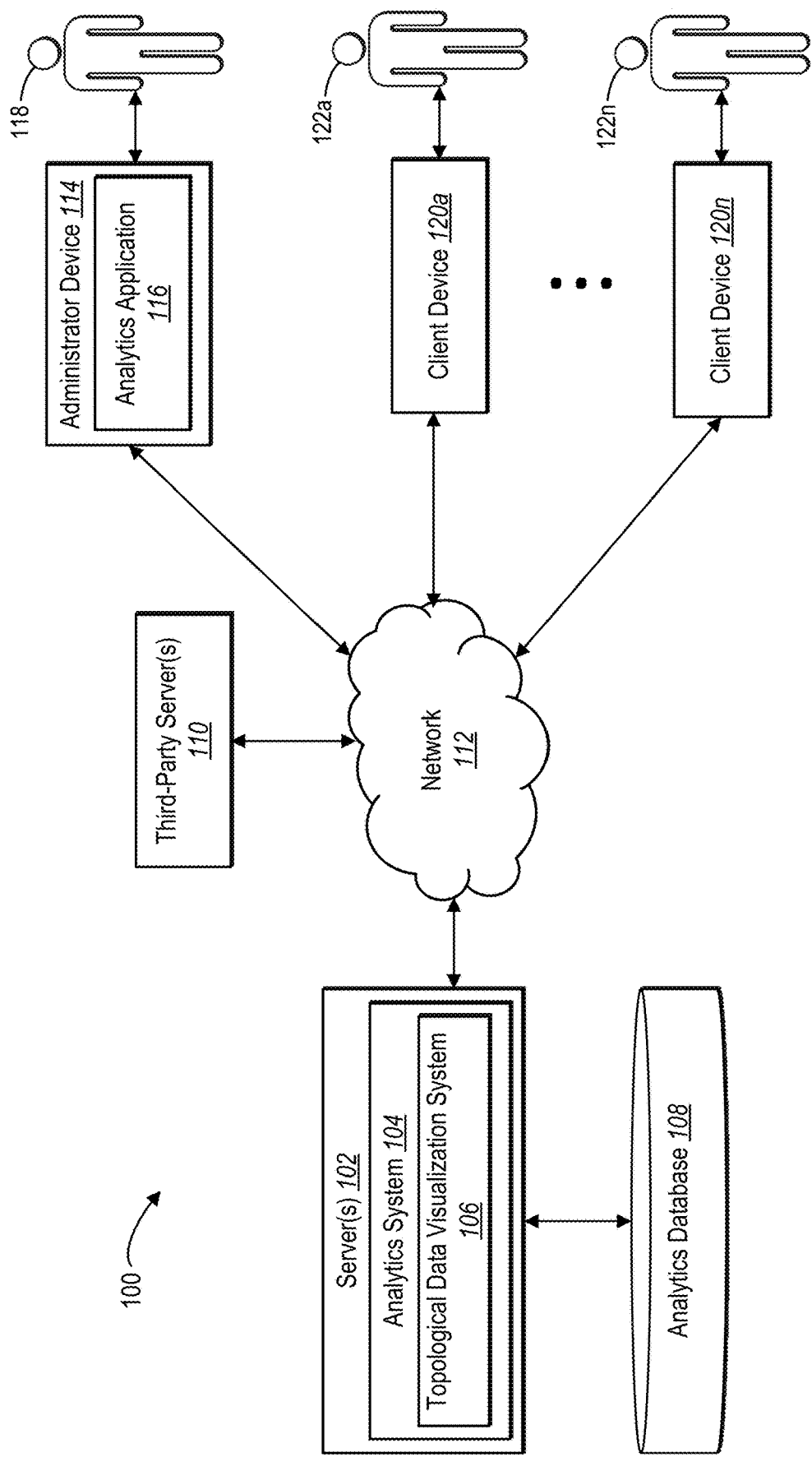
FIG. 1 illustrates a block diagram of an environment in which an analytics system and a topological data visualization system can operate in accordance with one or more embodiments.

This disclosure describes one or more embodiments of a topological data visualization system that generates and renders a varied-scale-topological construct for a multidimensional dataset to visually represent portions of the multidimensional dataset at varying topological scales. In certain implementations, for instance, the topological data visualization system generates and combines (i) an initial topological construct for a multidimensional dataset at one topological scale and (ii) a local topological construct for a subset of the multidimensional dataset at another topological scale to form a varied-scale-topological construct. To identify a region (or portion) from an initial topological construct to vary in scale, the topological data visualization system can determine the relative densities of various subsets of multidimensional data corresponding to regions of the initial topological construct and select one or more of such regions to change in topological scale.

For instance, in some embodiments, the topological data visualization system generates an initial topological construct for a multidimensional dataset at an initial topological scale. The topological data visualization system then selects a region of the initial topological construct for magnification, where the region corresponds to a subset of multidimensional data from the multidimensional dataset. Based on the selection of the region, the topological data visualization system generates a local topological construct for the subset of multidimensional data at an alternative topological scale. The topological data visualization system then combines the local topological construct for the subset of multidimensional data with the initial topological construct for the multidimensional dataset to generate a varied-scale-topological construct for the multidimensional dataset. The varied-scale-topological construct thus comprises subsets of the multidimensional dataset at varying scales. The topological data visualization system subsequently renders the varied-scale-topological construct for the multidimensional dataset as a topological visualization.

When generating topological constructs, in some embodiments, the topological data visualization system applies a Mapper algorithm to construct a nerve of an initial cover for a selected multidimensional dataset. For instance, the topological data visualization system can generate an initial Mapper construct as the initial topological construct for a multidimensional dataset and a local Mapper construct as the local topological construct for a subset of multidimensional data corresponding to a selected region. The topological data visualization system subsequently combines the initial Mapper construct and the local Mapper construct to generate a varied-scale-Mapper construct as the varied-scale-topological construct.

As suggested above, the topological data visualization system can select one or more regions of an initial topological construct for varying a topological scale (e.g., magnification). To select such a region, in some embodiments, the topological data visualization system identifies edges connecting nodes within a region, applies a clustering algorithm to shared sets of multidimensional data corresponding to the nodes, and determines whether the resulting clusters of multidimensional data (corresponding to the edges connecting the nodes) indicate a contractibility of nodes and edges within the region. When the clustering algorithm generates multiple clusters corresponding to an edge within the region—and determines the multiple clusters violate a contractibility principle—the topological data visualization system can select the region for magnification at an alternative topological scale.

In the alternative to using a clustering algorithm, in certain implementations, the topological data visualization system generates and analyzes multiple topological constructs corresponding to edges connecting nodes within different regions of an initial topological construct to determine which regions of the construct to vary in scale. For instance, the topological data visualization system can identify edges connecting nodes within a region, generate multiple topological constructs at different topological scales corresponding to each edge, and determine whether components corresponding to each edge are present (e.g., persistent) within the multiple topological constructs. When multiple disconnected components corresponding to an edge within the multiple topological constructs indicate a violation of a component-persistence threshold, the topological data visualization system can select the region comprising the edge for magnification at an alternative topological scale.

After selecting a region for magnification, in some embodiments, the topological data visualization system generates a local topological construct for a subset of multidimensional data (corresponding to the region) at an alternative topological scale. In some cases, the topological data visualization system generates the local topological construct based on a local cover comprising partitioned bin sections corresponding to the initial topological construct. By contrast, the topological data visualization system can also generate a set of clusters of multidimensional data corresponding to bins of a local cover, where the clusters represent a local topological construct for a subset of multidimensional data corresponding to the region. In certain implementations, the topological data visualization system can further identify a topological scale at which a topological construct for the subset of multidimensional data demonstrates contractibility (or satisfies a component-persistence threshold) to select an alternative topological scale for the local topological construct corresponding to the selected region for magnification.

In addition to generating a local topological construct, the topological data visualization system can combine the local topological construct with an initial topological construct to generate a varied-scale-topological construct for a multidimensional dataset. To perform such a combination, for example, the topological data visualization system generates a nerve for a new cover of the multidimensional dataset comprising connections between nodes in regions at varying topological scales. In some embodiments, the topological data visualization system identifies nodes in different regions for magnification at differing topological scales and determines edges connecting such nodes in different regions in the varied-scale-topological construct.

In addition to (or in combination with) generating a varied-scale-topological construct, the topological data visualization system can render such a construct as a topological visualization in a graphical user interface. Upon receiving a request from a client device for visualization of a multidimensional dataset, for example, the topological data visualization system renders (or provides a rendering of) a varied-scale-topological construct as a topological visualization within a graphical user interface of the client device.

As suggested above, the disclosed topological data visualization system overcomes several technical deficiencies that hinder conventional data-visualization systems. For example, the topological data visualization system improves the accuracy and precision with which existing data-visualization systems generate topological visualizations. By generating a varied-scale-topological construct for a multidimensional dataset and rendering a corresponding topological visualization, the topological data visualization system forms a topological visualization capturing connections and patterns among the multidimensional dataset that conventional systems cannot capture in a single visualization. Unlike the conventional topological visualizations that obscure such connections and patterns with too coarse (or too granular) of a scale, the topological data visualization system's varying topological scales can tailor a different scale to various regions of a topological construct. Such varying scales enable the topological data visualization system to accurately capture subsets of the multidimensional data in custom-scaled regions of a visualization.

In addition to more accurately capturing connections among multidimensional data, the topological data visualization system improves the flexibility with which a topological visualization captures details of a multidimensional dataset. Unlike the conventional Mapper algorithm that employs a fixed scale for an entire dataset of differing data density, the topological data visualization system intelligently varies the topological scale for different regions of a topological visualization to reflect such differing density. Indeed, the topological data visualization system captures such differences in a single topological visualization. Accordingly, unlike a Multiscale-Mapper algorithm that produces multiple topological visualizations, the disclosed topological data visualization system obviates the need to repeatedly render different topological visualizations to capture nuanced connections and patterns among a multidimensional dataset.

In combination with better accuracy and flexibility, in some implementations, the topological data visualization system simplifies and automates client-device interactions to construct a topological visualization. Unlike the conventional Mapper algorithm that can require input and adjustment of lens functions, types of covers, or clustering algorithms, the topological data visualization system can automate any such adjustments by region of a topological visualization (or corresponding subset of multidimensional data) to reduce and expedite client-device interactions with a system. By automatically tailoring a topological scale to a particular region or corresponding subset of multidimensional data, the topological data visualization system obviates the trial-and-error approach to the conventional Mapper algorithm, which compromises on a topological scale that suits some (but not all) of a multidimensional dataset. In contrast to such conventions, the topological data visualization system can intelligently select a scale suited to different regions of a topological construct.

As indicated by the foregoing description, this disclosure uses a variety of terms to describe features and advantages of the topological data visualization system. As used in this disclosure, the term "multidimensional data" refers to data comprising multiple attributes, characteristics, or features or, alternatively, multiple values or other indicators of such attributes, characteristics, or features. In some embodiments, for instance, multidimensional data refers to a dataset within which each data sample comprises multiple values or indicators of various features. Such a data sample for an individual user may comprise multiple values for different features, such as the features of age, location, device identifier, device type, and language, etc. In some cases, the number of features for each data sample exceeds an overall number of data samples.

As noted above, the topological data visualization system can generate a topological construction for a multidimensional dataset. The term "topological construct" refers to a digital model or digital structure comprising geometric or spatial relationships representing multidimensional data. In particular, in some embodiments, a topological construct refers to a lower-dimensional model or structure that represents multidimensional data in a simplicial complex. For example, a topological construct may include a Mapper construct or a Persistent-Homology construct, among other possible topological constructs.

Relatedly, the term "topological scale" refers to a resolution or level or measurement of magnification for a topological construct or a topological visualization. In particular, in some embodiments, a topological scale refers to a magnification setting at which nodes, edges, or other structures are presented in a topological construct or topological visualization. In some such cases, the topological data visualization system uses data-bin sizes as topological scales, where the data-bin size is measured by a ratio of an image diameter.

As explained below, the topological data visualization system optionally generates a topological construct of a multidimensional dataset based on a cover of the multidimensional dataset. The term "cover" refers to a categorization or organization of a dataset into different bins or data subsets. In particular, in some embodiments, a cover refers to a collection of bins or data subsets in which each data point from a multidimensional dataset is represented. In practice, multiple bins or data subsets often include a single data point from a multidimensional subset. In some cases, a cover is modified into a pullback cover. The term "pullback cover" refers to a cover that correlates data points from a bin or subset of a cover to data points in an initial dataset, such as an initial multidimensional dataset.

A cover can by generated in part by applying a lens function to a dataset. The term "lens function" refers to a function for encoding or representing an aspect, subset, or other information from a dataset. When applied to a multidimensional dataset, a lens function may, for instance, organize the multidimensional dataset into subsets of multidimensional according to an important dimension or set of dimensions.

Relatedly, the term "nerve" refers to a simplicial complex representing a dataset. In particular, in some embodiments, a nerve refers to a simplicial complex representing a multidimensional dataset with nodes and edges. In some cases, the topological data visualization system generates a nerve from a cover of a multidimensional dataset by collapsing each bin or data subset from the cover into nodes and edges, where edges indicate shared data points between data subsets corresponding to nodes.

As noted above, the topological data visualization system generates a varied-scale-topological construct. The term "varied-scale-topological construct" refers to a topological construct comprising regions depicted or represented at different topological scales, where such regions correspond to subsets of multidimensional data. In some embodiments, for instance, a varied-scale-topological construct refers to a topological construct comprising a nerve of a cover for a multidimensional dataset comprising one or more regions represented at different topological scales. Such a varied-scale-topological construct may include, for example, a first region corresponding to a first subset of multidimensional data at a first topological scale and a second region corresponding to a second subset of multidimensional data at a second topological scale.

A varied-scale-topological construct can be represented as a topological visualization. The term "topological visualization" refers to a graphical representation of a topological construct. For instance, in some embodiments, a topological visualization refers to a map or graph that uses geometric or spatial relationships to represent a topological construct. As described below, in some cases, a topological visualization includes a Mapper graph with a simplicial complex.

Turning now to FIG. 1, this figure depicts a block diagram illustrating an exemplary system environment ("environment") 100 in which a topological data visualization system 106 can operate in accordance with one or more embodiments. Specifically, FIG. 1 illustrates the environment 100 comprising server(s) 102, third-party server(s) 110, a network 112, an administrator device 114, an administrator 118 associated with the administrator device 114, client devices 120a-120n, and users 122a-122n associated with the client devices 120a-122n. Although FIG. 1 illustrates one administrator device and one administrator—and two client devices and two users—the environment 100 can alternatively include any number of computing devices and associated administrators or users. Similarly, although FIG. 1 illustrates a particular arrangement of the server(s) 102, the third-party server(s) 110, the network 112, the administrator device 114, and the client devices 120a-120n, various additional arrangements are possible.

As shown in FIG. 1, the server(s) 102, the third-party server(s) 110, the network 112, the administrator device 114, and the client devices 120a-120n may be communicatively coupled with each other either directly or indirectly, such as coupling through the network 112, which is described further below in relation to FIG. 11. The server(s) 102, the administrator device 114, and the client devices 120a-120n may include any type of computing device, including one or more computing devices as discussed further below in relation to FIG. 11.

As depicted in FIG. 1, the server(s) 102 can generate, store, receive, and/or transmit any type of data, including requests for multidimensional datasets or visualizations of multidimensional datasets. For example, the server(s) 102 can receive a request for a visualization of a multidimensional dataset from the administrator device 114. The server(s) 102 can further transmit data packets that, upon receipt, cause the administrator device 114 to present a topological visualization of a varied-scale-topological construct within a graphical user interface. In some embodiments, the server(s) 102 comprise a data server, a communication server, or a web-hosting server.

As further shown in FIG. 1, the server(s) 102 can include an analytics system 104. The analytics system 104 can perform various digital-analytics functions or digital-campaign functions. For example, in some embodiments, the analytics system 104 uses the server(s) 102 to collect data corresponding to attributes, characteristics, or features of users (or devices) from the client devices 120a-120n (e.g., by collecting data tracking application uses, orders, purchases, or webpage views). The analytics system 104 may collect such datasets to determine or identify values representing such attributes, characteristics, or features of the users 122a-122n. Relatedly, in some cases, the third-party server(s) 110 or the analytics system 104 via the server(s) 102 track actions performed; files accessed, downloaded, or purchased; products or services downloaded or used; or transactions made by the client devices 120a-120n in connection with the server(s) 102 or the third-party server(s) 110.

In addition to the analytics system 104, the server(s) 102 can include the topological data visualization system 106. The topological data visualization system 106 (or the analytics system 104) can use the server(s) 102 to request from the third-party server(s) 110 (or retrieve from an analytics database 108) datasets corresponding to the users 122a-122n to store in the analytics database 108, such as datasets representing actions, files, information, products or services, transactions, or websites related to particular users.

The topological data visualization system 106 can further use the server(s) 102 to sample a subset of users and a corresponding subset of contact characteristics from the analytics database 108. From the subset of users, in certain implementations, the topological data visualization system 106 further uses the server(s) 102 to (i) generate an initial topological construct for a multidimensional dataset at an initial topological scale and (ii) select a region of the initial topological construct for magnification, where the region corresponds to a subset of multidimensional data from the multidimensional dataset. Based on the selection of the region, the topological data visualization system 106 uses the server(s) 102 to (iii) generate a local topological construct for the subset of multidimensional data at an alternative topological scale, (iv) combine the local topological construct with the initial topological construct to generate a varied-scale-topological construct for the multidimensional dataset, and (v) render the varied-scale-topological construct for the multidimensional dataset as a topological visualization.

As suggested by previous embodiments, the topological data visualization system 106 can be implemented in whole or in part by the individual elements of the environment 100. Although FIG. 1 illustrates the topological data visualization system 106 implemented within the server(s) 102, components of the topological data visualization system 106 can be implemented in any of the components of the environment 100. For instance, in some embodiments, the administrator device 114 comprises the topological data visualization system 106 and performs all of the functions, methods, and processes of the topological data visualization system 106 described above and below. This disclosure describes the components of the topological data visualization system 106 further below with regard to FIG. 9.

As further shown in FIG. 1, in some embodiments, the administrator device 114 comprises a computing device that enables the administrator 118 to send and receive digital communications. For example, the administrator device 114 can include a desktop computer, laptop computer, smartphone, tablet, or other electronic device. In some embodiments, the administrator device 114 further includes one or more software applications (e.g., an analytics application 116) that enables the administrator 118 to send and receive digital communications. For example, the analytics application 116 can be a software application installed on the administrator device 114 or a software application hosted on the server(s) 102. When hosted on the server(s) 102, the analytics application 116 may be accessed by the administrator device 114 through another application, such as a web browser.

In some implementations, the analytics application 116 includes instructions that, when executed by a processor, cause the administrator device 114 to present one or more graphical user interfaces, such as various user interfaces comprising topological visualizations described below. For example, in certain embodiments, the analytics application 116 includes instructions that, when executed by a processor, cause the administrator device 114 to present graphical user interfaces comprising options to select one or more multidimensional datasets and to visualize selected multidimensional datasets.

As also illustrated in FIG. 1, the analytics system 104 is communicatively coupled to the analytics database 108. Among other things, the analytics database 108 includes various multidimensional datasets. In one or more embodiments, the analytics system 104 accesses and queries data from the analytics database 108 associated with requests from the topological data visualization system 106. For instance, the analytics system 104 may access multidimensional datasets corresponding to users, financial transactions, insurance transactions, vehicles, or any other digital entity for the topological data visualization system 106. As shown in FIG. 1, the analytics database 108 is separately maintained from the server(s) 102. Alternatively, in one or more embodiments, the analytics system 104 and the analytics database 108 comprise a single combined system or subsystem within the server(s) 102.

Figure 2:
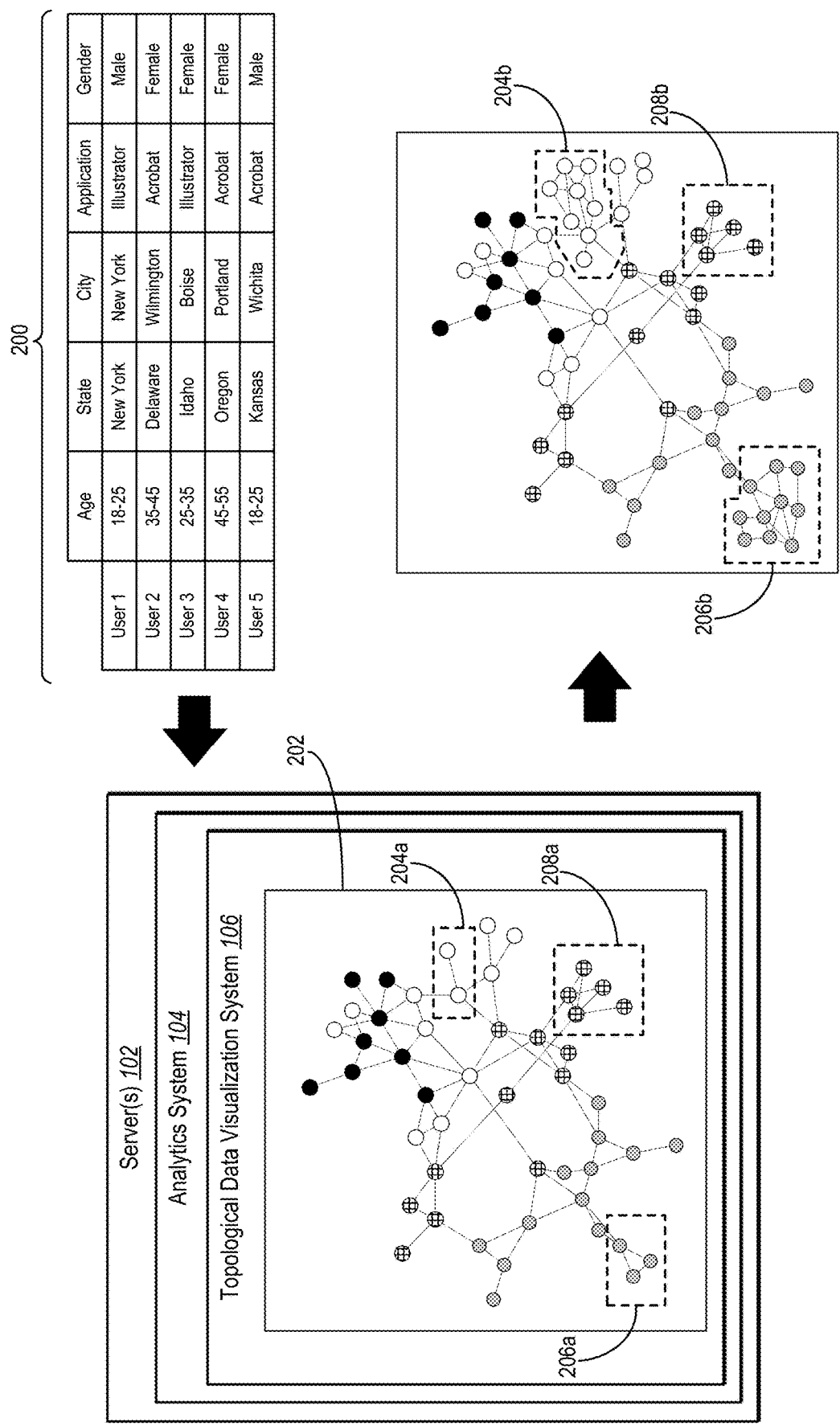
FIG. 2 illustrates a topological data visualization system generating and rendering a varied-scale-topological construct for a multidimensional dataset in accordance with one or more embodiments.

FIG. 2 illustrates an embodiment of the topological data visualization system 106. In general, and as shown in FIG. 2, the topological data visualization system 106 generates an initial topological construct for a multidimensional dataset at an initial topological scale based on a dataset-visualization request. The topological data visualization system 106 further (i) generates local topological constructs for selected regions of the initial topological construct at alternative topological scales and (ii) combines the local topological constructs with the initial topological construct to produce a varied-scale-topological construct for the multidimensional dataset. Upon rendering, the varied-scale-topological construct represents portions of the multidimensional dataset at varying topological scales.

As indicated by FIG. 2, for example, the topological data visualization system 106 receives an indication of user input requesting visualization of a multidimensional dataset 200. Consistent with the disclosure above, the multidimensional dataset 200 includes data samples (e.g., users) that each correspond to multiple different features. Each entry for a user, for example, corresponds to features of age, city, state, gender, and application. Other data entries or features could likewise be used as examples. Despite the multidimensional nature of the data, the topological data visualization system 106 can generate a topological visualization of the multidimensional dataset 200 in a lower-dimensional representation upon request.

Based on the dataset-visualization request, for instance, the topological data visualization system 106 generates an initial topological construct 202 for the multidimensional dataset 200 at an initial topological scale. As shown in FIG. 2, the initial topological construct 202 comprises various regions corresponding to subsets of the multidimensional dataset 200—including a first region 204a, a second region 206a, and a third region 208a. By applying a Mapper algorithm, for example, the topological data visualization system 106 generates the initial topological construct 202 with each region corresponding to a subset of multidimensional data constructed at the initial topological scale.

As indicated above, the topological data visualization system 106 can select regions from the initial topological construct 202 for magnification at different topological scales. Based on analyzing the data density of a subset of multidimensional data corresponding to each region, for instance, the topological data visualization system 106 selects the first region 204a and the second region 206a for magnification, but not the third region 208a. In some cases, the topological data visualization system 106 selects the first region 204a and the second region 206a of the initial topological construct 202 because the data density of those regions exceed the data density of other regions within the initial topological construct 202, such as the third region 208a. A magnified topological scale for such regions would better illustrate relationships among the multidimensional dataset 200.

As further suggested by FIG. 2, the topological data visualization system 106 generates (i) a local topological construct for a subset of multidimensional data corresponding to the second region 206a at a first alternative topological scale and (ii) a local topological construct for a subset of multidimensional data corresponding to the third region 208a at a second alternative topological scale. As shown in FIG. 2, the topological data visualization system 106 subsequently combines the local topological constructs with the initial topological construct 202 to generate a varied-scale-topological construct 210 of the multidimensional dataset 200.

As shown as a topological visualization, the varied-scale-topological construct 210 comprises various regions corresponding to subsets of the multidimensional dataset 200—including a first region 204b, a second region 206b, and a third region 208b. The first region 204b, the second region 206b, and the third region 208b of the varied-scale-topological construct 210 correspond to (and represent the same subset of multidimensional data as) the first region 204a, the second region 206a, and the third region 208a of the initial topological construct 202, respectively. As represented in the varied-scale-topological construct 210, the topological data visualization system 106 renders nodes and edges representing multidimensional-data subsets at each of the first region 204b, the second region 206b, and the third region 208b at different topological scales. By utilizing different topological scales, the varied-scale-topological construct 210 captures connections and patterns among the multidimensional dataset 200 not captured by the initial topological construct 202.

Figure 3:
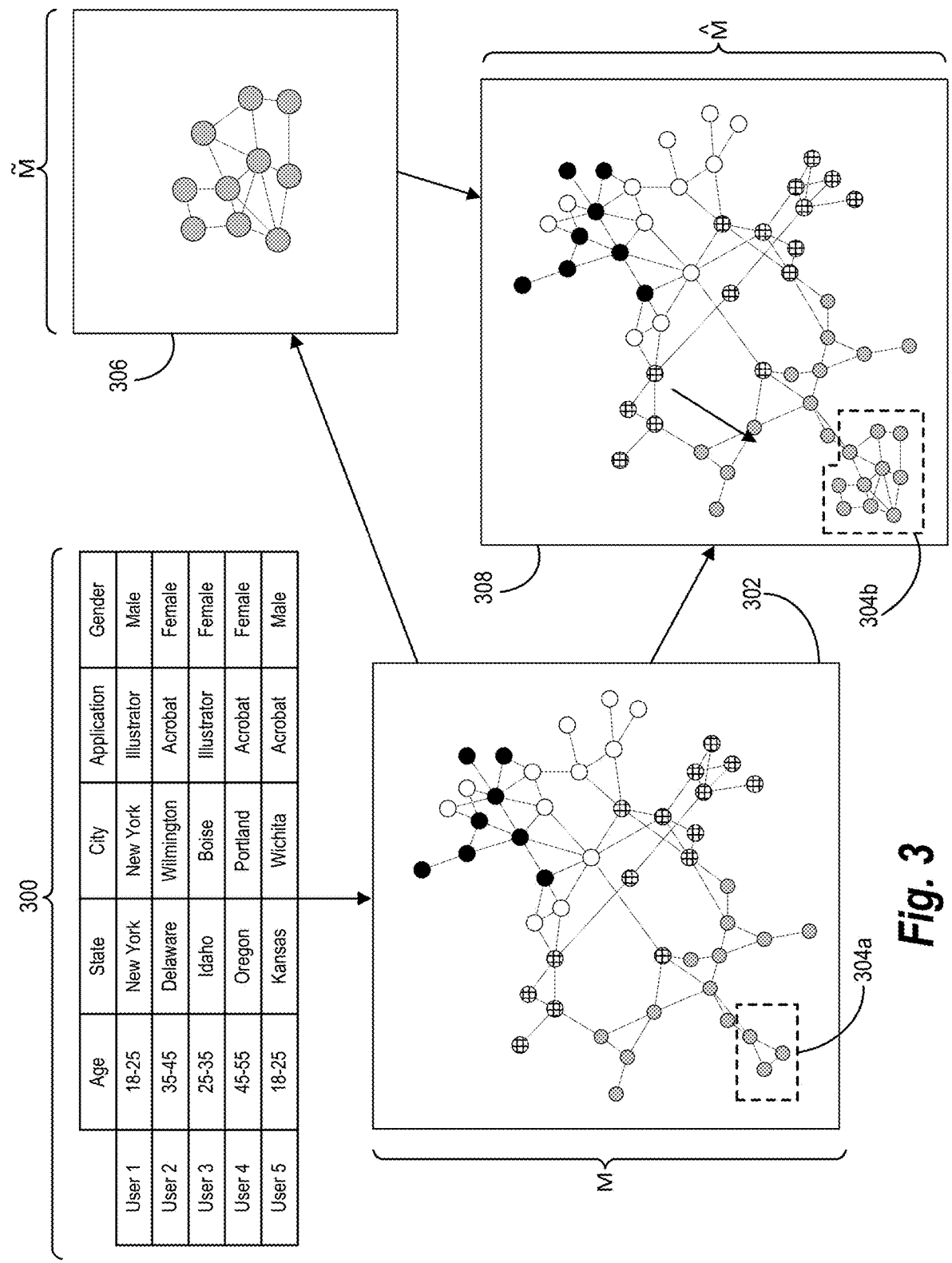
FIG. 3 illustrates a topological data visualization system generating and combining an initial topological construct for a multidimensional dataset and a local topological construct for a subset of multidimensional data to form a varied-scale-topological construct in accordance with one or more embodiments.

As suggested above, the topological data visualization system 106 can select a region of an initial topological construct and generate a local topological construct for a subset of multidimensional data corresponding to the selected region at a magnified topological scale. FIG. 3 illustrates an example of the topological data visualization system 106 generating and combining an initial topological construct 302 for a multidimensional dataset 300 and a local topological construct 306 for a subset of multidimensional data to form a varied-scale-topological construct 308. Among other things, FIG. 3 depicts a difference in topological scales between the initial topological construct 302 and the local topological construct 306.

As depicted in FIG. 3, the topological data visualization system 106 generates the initial topological construct 302 for the multidimensional dataset 300 at an initial topological scale in response to a data-visualization request. The topological data visualization system 106 subsequently selects a region 304a of the initial topological construct 302 based on a relative data density of a subset of multidimensional data within the region 304a. Based on the selection of the region 304a, the topological data visualization system 106 generates the local topological construct 306 for the subset of multidimensional data at an alternative topological scale.

As FIG. 3 depicts, the alternative topological scale for the local topological construct 306 magnifies connections and patterns within the corresponding subset of multidimensional data in the form of more granular nodes and edges. Whereas the initial topological construct 302 represents the subset of multidimensional data in the region 304a at an initial (and coarser) topological scale shown with nodes and edges, the local topological construct 306 represents the subset of multidimensional data in the region 304a at an alternative (and more granular) topological scale shown with more detailed nodes and edges.

After generating the more granular topological construct for the region 304a, the topological data visualization system 106 combines the initial topological construct 302 and the local topological construct 306 to generate the varied-scale-topological construct 308 for the multidimensional dataset 300. As shown in FIG. 3, the varied-scale-topological construct 308 comprises various regions corresponding to subsets of the multidimensional dataset 300, including the region 304b. The region 304b in the varied-scale-topological construct 308 corresponds to (and represents the same subset of multidimensional data as) the region 304a in the initial topological construct 302. The varied-scale-topological construct 308 accordingly represents the subset of multidimensional data for the region 304b at a magnified topological scale in comparison to other regions.

As further indicated by FIG. 3, in some cases, the topological data visualization system 106 generates an initial Mapper construct M as the initial topological construct 302 for the multidimensional dataset 300 and a local Mapper construct $\tilde{M}$ as the local topological construct 306 for a subset of multidimensional data corresponding to the region 304a. The topological data visualization system 106 subsequently combines the initial Mapper construct M and the local Mapper construct $\tilde{M}$ to generate a varied-scale-Mapper construct $\mathcal{M}$ as the varied-scale-topological construct 308.

To generate such an initial Mapper construct M, in some embodiments, the topological data visualization system 106 applies a Mapper algorithm. As set forth below, this disclosure explains concepts from topological data analysis used in the Mapper algorithm and application of the Mapper algorithm in FIG. 3 according to one or more embodiments. In some topological data analyses, for instance, a dataset can be represented by a point cloud forming a space X. To visualize a given a dataset, an open cover $\mathcal{U} = \{U_\alpha : \alpha \in A\}$ of a space X for a dataset constitutes a collection of open sets (e.g., subsets of the dataset), such that each data point in the space X is in at least one of these open sets. Each open set from an open cover constitutes a bin comprising a subset of data. Conceptually, to generate an open cover of a space X for a dataset, a data-visualization system assigns each data point from the dataset into a bin. An open cover thus constitutes a lower-dimensional representation of a dataset organized in bins. Accordingly, this disclosure often refers to the elements of a cover as bins.

In some applications of topological data analysis, a cover forms a basis for generating a simplicial complex of nodes, edges, and n-dimensional counterparts. A simplicial complex constitutes a visual representation of a dataset in multiple simplices, where a k-simplex (or k-dimensional simplex) represents a single simplex for a simplicial complex K. In particular, a k-simplex constitutes the smallest convex set containing a given set of k+1 affinity independent vectors, where vectors $u_0, u_1, \ldots, u_k$ are finely independent if vectors $u_1-u_0, u_2-u_0, \ldots, u_k-u_0$ are linearly independent. Further, an m-simplex σ' constitutes an m-face of a k-simplex σ if m<k and the vertices of σ' constitute a proper subset of the vertices of σ.

Formally, a simplicial complex K comprises a set of simplices, such that a face of a simplex from the simplicial complex K is also in the simplicial complex K and $\forall \sigma_1, \sigma_2 \in K$, $\sigma_1 \cap \sigma_2$ is a face of both simplex $\sigma_1$ and simplex $\sigma_2$. To illustrate the shape of various k-simplices (or k-dimensional simplices) within a simplicial complex K, for instance, a 1-simplex constitutes a line segment, a 2-simplex constitutes a triangle, and a 3-simplex constitutes a tetrahedron. For a 3-simplex (or a tetrahedron), 0-faces constitute the tetrahedron's vertices, 1-faces constitute the tetrahedron's edges, and 2-faces constitute the tetrahedron's triangular sides.

As further suggested above, the topological data visualization system 106 can construct a nerve for a simplicial complex when performing topological data analysis. Given a cover $\mathcal{U}$ of space X, for instance, a nerve $N(\mathcal{U})$ constitutes a simplicial complex comprising vertices (e.g., nodes) of the nerve $N(\mathcal{U})$ corresponding to bins of the cover $\mathcal{U}$. For each of k+1 bins of the cover $\mathcal{U}$ having mutual non-empty intersection in space X, the nerve $N(\mathcal{U})$ contains a k-simplex with corresponding nodes as its vertices. The nerve $N(\mathcal{U})$, therefore, comports with the Nerve Theorem originally postulated by Pavel Alexandrov and the concepts of contractibility and homotopy equivalence.

Consistent with the Nerve Theorem, if a cover $\mathcal{U}$ is an open cover of a paracompact space X for a dataset—and every non-empty intersection of finitely many sets in $\mathcal{U}$ is contractible—then the space X is homotopy equivalent to a nerve $N(\mathcal{U})$. When an intersection is contractible, the intersection can be continuously shrunk to a point in space X. When shapes are homotopy equivalent, a first shape is similar to a second shape such that (under certain conditions) the first shape can be deformed into the second shape. When the space X is homotopy equivalent to the nerve $N(\mathcal{U})$, therefore, the space X can be deformed into the nerve $N(\mathcal{U})$.

As suggested above, a topological data analysis often uses a point cloud lying in $\mathbb{R}^n$, where $\mathbb{R}^n n \in N$ and $\mathbb{R}^n$ is a metric space. Above and below, this disclosure often represents a point could with the symbol X sampled from a paracompact space in $\mathbb{R}^n$. Because every metric space is paracompact, the assumption in the Nerve Theorem above that space X constitutes a paracompact space is satisfied. To compute topological properties of such a point cloud, a topological data analysis assumes that the point cloud is sampled from a paracompact space in $\mathbb{R}^n$.

The Mapper algorithm utilizes the foregoing concepts from topological data analysis. As indicated above, the topological data visualization system 106 can apply the Mapper algorithm to generate the initial topological construct 302 shown in FIG. 3, for example. To apply the Mapper algorithm, in some embodiments, the topological data visualization system 106 projects a point cloud X into an initial lower-dimensional-image space Z using a lens function $f$. The topological data visualization system 106 then generates a cover $\mathcal{U}$ on an image by using a pre-image of each bin under the lens function $f$, such that the cover constitutes $f^{-1}(\mathcal{U})$ of X. In particular, in some embodiments, the topological data visualization system 106 uses the following equation to generate a cover for X:

$$f^{-1}(\mathcal{U}) = \{f^{-1}(U_\alpha) : U_\alpha \in \mathcal{U}\} \tag{1}$$

As part of applying the Mapper algorithm, the topological data visualization system 106 further modifies the cover $f^{-1}(\mathcal{U})$ to generate a pullback cover. To generate a modified pullback cover $f^*(\mathcal{U})$ of X from bins of the cover $f^{-1}(\mathcal{U})$, in some embodiments, the topological data visualization system 106 uses the following equation defining a pullback cover of $\mathcal{U}$ under the lens function $f$:

$$f^*(\mathcal{U}) = \{C : \exists V \in f^{-1}(\mathcal{U}), C \in P(V)\} \tag{2}$$

In equation (2), P(V) represents a set of path-connected components of V. In some embodiments (e.g., a discrete setting), the topological data visualization system 106 approximates such path-connected components with clusters of multidimensional data. Accordingly, the topological data visualization system 106 generates the modified pullback cover $f^*(\mathcal{U})$ by clustering multidimensional data within each bin of the cover $f^{-1}(\mathcal{U})$.

Having generated the modified pullback cover $f^*(\mathcal{U})$, the topological data visualization system 106 computes a nerve for the modified pullback cover $f^*(\mathcal{U})$, where the nerve represents a Mapper construct $M(X, \mathcal{U}, f)$ of X. Formally, given a space X, a lens function $f$, and a cover $\mathcal{U}$ of $f(X)$, the following equation defines a Mapper construct M:

$$M(X, \mathcal{U}, f) = N(f^*(\mathcal{U})) \tag{3}$$

When the topological data visualization system 106 renders a Mapper construct M according to equation (3), the topological data visualization system 106 renders a 1-dimensional skeleton in graph form comprising simplices to 1-dimension from the Mapper construct. This 1-dimensional skeleton in graph form is sometimes called a Mapper graph. While the foregoing explanation summarizes the Mapper algorithm, in some embodiments, the topological data visualization system 106 applies the Mapper algorithm or method described by Gurjeet Singh et al., "Topological Methods for the Analysis of High Dimensional Data Sets and 3D Object Recognition," *Eurographics Symposium on Point-Based Graphics* (2007), the entire contents of which are incorporated by reference. For purposes of simplicity, this disclosure generally refers to a Mapper construct $M(X, \mathcal{U}, f)$ as simply M without reference to X, $\mathcal{U}$, or $f$ from equation (3). As shown in FIG. 3, in some embodiments, the topological data visualization system 106 applies the Mapper algorithm to generate the initial topological construct 302 consistent with equation (3).

To generate the local topological construct 306 in FIG. 3, in some embodiments, the topological data visualization system 106 partitions a portion of the initial lower-dimensional-image space corresponding to the region 304a into bin sections or subsections and generates a local cover based on the partitioned bin sections. As an overview, the topological data visualization system 106 can use a lens function to project the subset of multidimensional data corresponding to the region 304a into a local lower-dimensional-image space, partition the initial lower-dimensional-image space into bin sections (and bin subsections) corresponding to the local lower-dimensional-image space, and generate the local topological construct 306 based on a local cover for the subset of multidimensional data corresponding to the bin sections (or bin subsections).

When partitioning a lower-dimensional-image space, the topological data visualization system 106 generally selects a particular type of partition (e.g., cuboidal bins) for an initial topological construct and refines the partition consistent with a percentage of overlap between bins. By partitioning a portion of the initial lower-dimensional-image space corresponding to the region 304a (or another selected region) of the initial topological construct 302, the topological data visualization system 106 decreases the size of bins as a basis for generating a local cover. As set forth below, in some embodiments, the topological data visualization system 106 uses the following equations (4)-(7) to partition a portion of an initial lower-dimensional-image space (corresponding to a region) and generate a local cover for a subset of multidimensional data.

Consistent with the disclosure above, the topological data visualization system 106 selects a region $\tilde{X}$ from an initial topological construct, where the region $\tilde{X}$ comprises a subset of nodes S for magnification and corresponds to a subset of multidimensional data. Such a region $\tilde{X}$ comports with the following equation:

$$\tilde{X} = \bigcup_{w \in S} C_w \tag{4}$$

In equation (4), $C_w$ represents a cluster of multidimensional data corresponding to a node w.

Having identified the region $\tilde{X}$, the topological data visualization system 106 uses the lens function to project the subset of multidimensional data corresponding to the region $\tilde{X}$ into a local lower-dimensional-image space $\tilde{Z}$ according to the following equation:

$$\tilde{Z} = f(\tilde{X}) \tag{5}$$

Having projected the subset of multidimensional data into a local lower-dimensional-image space $\tilde{Z}$, the topological data visualization system 106 partitions portions of the initial lower-dimensional-image space Z (for the initial Mapper construct M) into bin sections corresponding to the local lower-dimensional-image space $\tilde{Z}$.

In particular, given $\mathcal{P}$ as the initial partition for the initial lower-dimensional-image space Z, where Z=$f$(X), the topological data visualization system 106 partitions the initial lower-dimensional-image space Z (or a region of the initial lower-dimensional-image space Z) into bin sections comprising some part of the local lower-dimensional-image space $\tilde{Z}$, according to the following equation:

$$\mathcal{P}' = \{P \in \mathcal{P} : P \cap \tilde{Z} \neq \emptyset\} \tag{6}$$

In equation (6), $\mathcal{P}'$ represents a modified partition comprising bin sections comprising some of the local lower-dimensional-image space $\tilde{Z}$.

Figure 4:
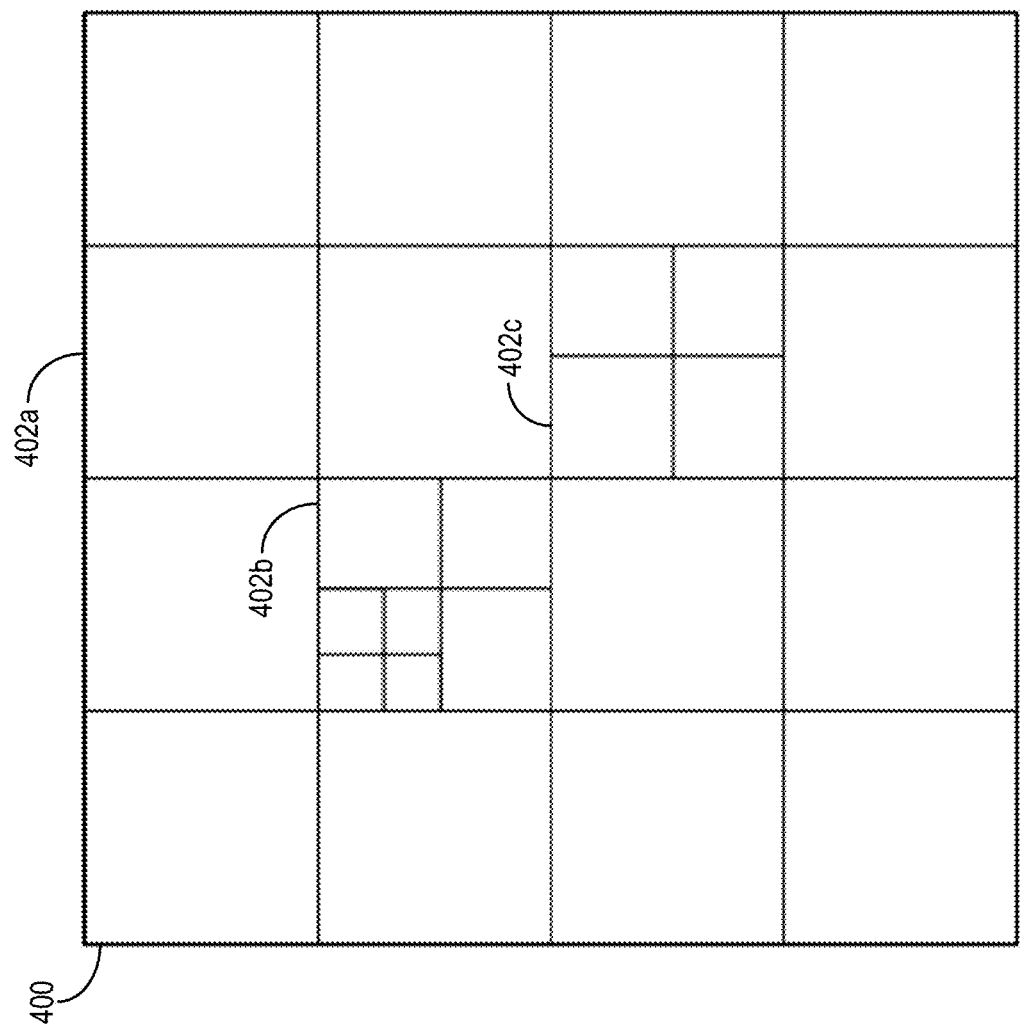
FIG. 4 illustrates a topological data visualization system partitioning a lower-dimensional-image space into bin sections and bin subsections in accordance with one or more embodiments.

The topological data visualization system 106 subsequently refines the bin sections into bin subsections. In some embodiments, the topological data visualization system 106 refines the bin sections by slicing (or partitioning) each cuboidal bin of the partition $\mathcal{P}'$ along each dimension to form a partition $\mathcal{P}''$, where the partition $\mathcal{P}''$ comprises the bin subsections. When partitioning and refining such bin sections, for example, the topological data visualization system 106 can divide a 1-dimensional interval into half or slice a 2-dimensional cuboidal bin into four equal 2-dimensional cuboidal bins. As described below, FIG. 4 provides an example of such partitioning and refinement. When refining bin sections by a factor of 2, the topological data visualization system 106 slices a region of the initial lower-dimensional-image space Z into m bin sections along each axis in a refinement by m.

The topological data visualization system 106 further uses the bin sections (and bin subsections) to generate a local cover $\tilde{u}$ for the region and (from the local cover $\tilde{u}$) a local Mapper construct $\tilde{M}$. To generate the local cover $\tilde{u}$, the topological data visualization system 106 uses the partition $\tilde{\mathcal{P}}$ corresponding to the local lower-dimensional-image space $\tilde{Z}$, as follows:

$$\tilde{\mathcal{P}} = (\mathcal{P} \setminus \mathcal{P}') \cup \mathcal{P}'' \qquad (7)$$

By using the partition $\tilde{\mathcal{P}}$, the topological data visualization system 106 can generate a local Mapper construct $\tilde{M}$ at an alternative topological scale, where $\tilde{M}(\tilde{X}, \tilde{u}, f)$ of $\tilde{X}$ defines the local Mapper construct $\tilde{M}$. In some embodiments, the topological data visualization system 106 further uses equations (4)-(7) to partition another selected region of the initial Mapper construct M, generate another local cover $\tilde{\mathcal{P}}$ for a subset of multidimensional data corresponding to the selected region, and generate another local Mapper construct $\tilde{M}$ at an alternative topological scale as part of a varied-scale-Mapper construct $\mathcal{M}$.

As noted above, FIG. 4 illustrates the topological data visualization system 106 partitioning an initial lower-dimensional-image space into bin sections and bin subsections as a basis for generating a local cover for a selected region. As shown in FIG. 4, the topological data visualization system 106 generates a partition 400 for an initial lower-dimensional-image space, such as the initial partition $\mathcal{P}$ for the initial lower-dimensional-image space Z. The partition 400 includes multiple bins, including bins 402a, 402b, and 402c. In this particular embodiment, each bin constitutes a cuboidal bin, but other shaped bins may be used in additional or alternative embodiments.

As further shown in FIG. 4, the topological data visualization system 106 partitions the bin 402b into four bin sections and the bin 402c into four bin sections. In some embodiments, the topological data visualization system 106 further refines (or further partitions) bin sections into bin subsections. For instance, the topological data visualization system 106 refines one bin section within the bin 402b into four bin subsections. Such partitioning or refinement can be cyclical. In some cases, the topological data visualization system 106 repeats the partitioning process of bins into bin sections (and then into bin subsections) for bins corresponding to additional selected regions of an initial topological construct.

In one or more embodiments, relying on the Mapper algorithm and partitioning image space to generate a local Mapper construct $\tilde{M}$ can have some limitations. In some cases, the lens function $f$ cannot map distant parts of a space X to the initial lower-dimensional-image space Z. By magnifying and projecting a subset of multidimensional data from a region $\tilde{X}$ to a local lower-dimensional-image space $\tilde{Z}$, the topological data visualization system 106 magnifies an inverse cover $f^{-1}(\tilde{Z}) = f^{-1}(f(\tilde{X}))$. But this inverse cover potentially represents a larger region than the region $\tilde{X}$ and may comprise portions of a multidimensional dataset distant from the region $\tilde{X}$. Accordingly, a local Mapper construct $\tilde{M}$ may include portions of the multidimensional data outside the selected region of an initial Mapper construct M and not intended for magnification. To avoid such unintended magnification of the lens function $f$—and to retain the convenience of constructing a pullback cover under the lens function $f$—this disclosure describes an alternative embodiment of the topological data visualization system 106 with reference to FIG. 5.

Figure 5:
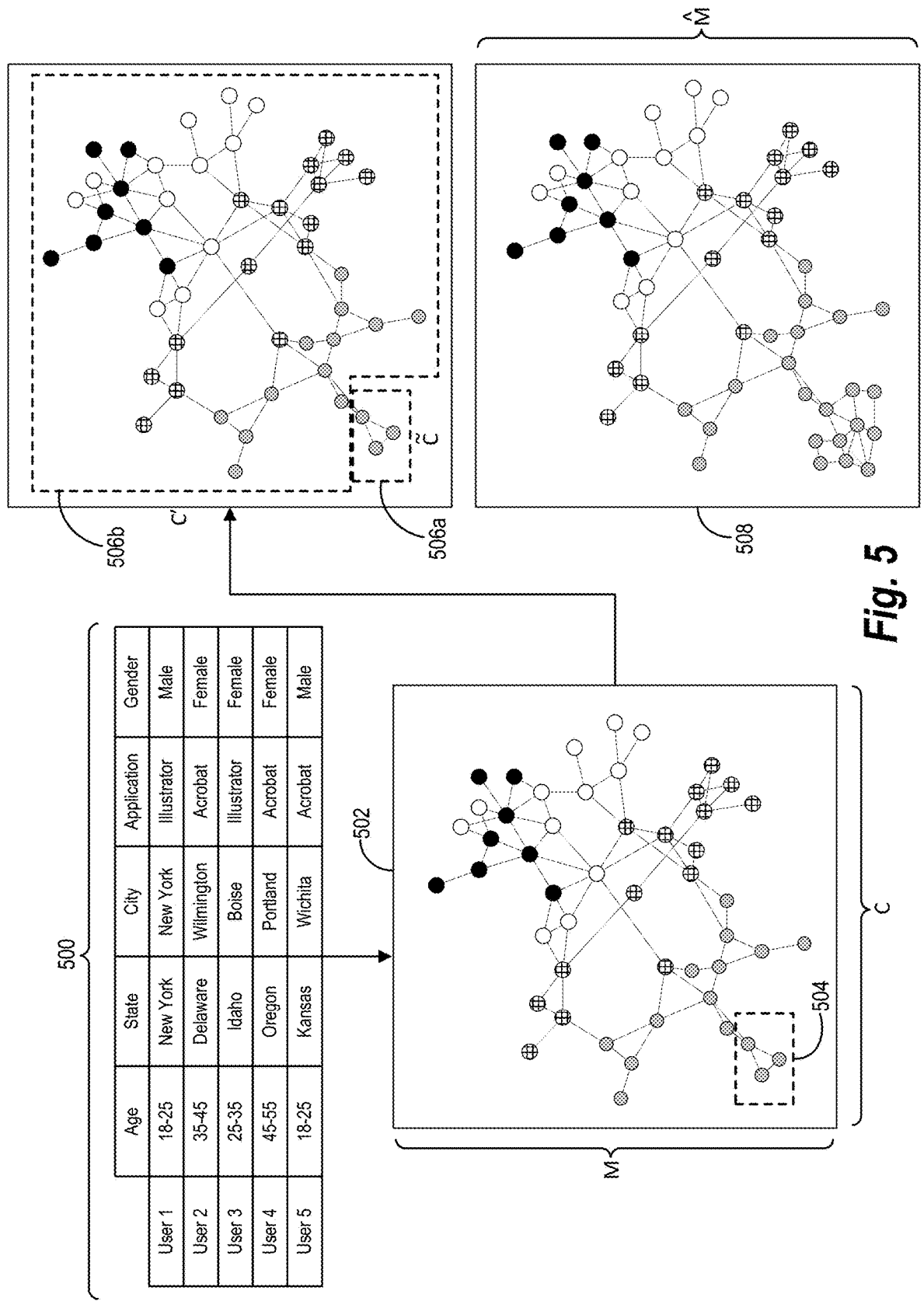
FIG. 5 illustrates a topological data visualization system generating a nerve for a new cover of a multidimensional dataset as part of generating a varied-scale-topological construct in accordance with one or more embodiments.

FIG. 5 illustrates the topological data visualization system 106 generating a nerve for a new cover of a multidimensional dataset 500 as part of generating a varied-scale-topological construct 508 for the multidimensional dataset 500. As suggested by FIG. 5, the topological data visualization system 106 generates the varied-scale-topological construct 508 in part by selecting a region 504 of an initial topological construct 502 and identifying a first set of nodes corresponding to a first subset of multidimensional data and a second subset of nodes corresponding to a second subset of multidimensional data. Each set of nodes corresponds to a set of clusters of multidimensional data from bins of a local cover. Upon identifying the first and second sets of nodes, the topological data visualization system 106 determines edges for the varied-scale-topological construct 508 corresponding to intersections between the nodes from the first and second set of nodes and thereby indicate connections between the first subset of multidimensional data and the second subset of multidimensional data within the varied-scale-topological construct 508.

As shown in FIG. 5, for example, the topological data visualization system 106 generates the initial topological construct 502 for the multidimensional dataset 500 at an initial topological scale in response to a data-visualization request. The topological data visualization system 106 subsequently selects the region 504 of the initial topological construct 502 based on a relative data density of a subset of multidimensional data within the region 504. Based on selecting the region 504, the topological data visualization system 106 generates a local cover for a subset of multidimensional data corresponding to the region 504 utilizing a lens function.

Similar to covers described above, the local cover comprises bins that the topological data visualization system 106 uses to generate clusters of multidimensional data representing a local topological construct. In particular, the topological data visualization system 106 identifies inverse images corresponding to each bin of the local cover and generates a first set of clusters of multidimensional data for the inverse images corresponding to each bin. As indicated by FIG. 5, the first set of clusters corresponds to the multidimensional data represented by nodes 506a of the initial topological construct 502. The first set of clusters accordingly correspond to the region 504 and represent a local topological construct for a subset of multidimensional data at an alternative topological scale.

Having generated the first set of clusters, the topological data visualization system 106 identifies (or generates) a second set of clusters of multidimensional data outside of the region 504. As shown in FIG. 5, the second set of clusters corresponds to the multidimensional data represented by nodes 506b of the initial topological construct 502. The topological data visualization system 106 further determines simplices corresponding to intersections between the first set of clusters and the second set of clusters.

Such simplices form part of the varied-scale-topological construct 508 shown in FIG. 5. The topological data visualization system 106 subsequently generates a nerve for a new cover of the multidimensional dataset 500. The nerve comprises the simplices corresponding to the intersections between the first and second sets of clusters.

As suggested above, the topological data visualization system 106 may likewise select (and generate additional sets of clusters of multidimensional data) for additional regions of the initial topological construct 502 for magnification at alternative topological scales. The topological data visualization system 106 can accordingly determine additional simplices corresponding to intersections between such additional sets of clusters and other sets of clusters to include in the nerve for the varied-scale-topological construct 508.

As further indicated by FIG. 5, in some cases, the topological data visualization system 106 generates an initial Mapper construct M as the initial topological construct 502 for the multidimensional dataset 500 and a local Mapper construct $\tilde{M}$ as a local topological construct for a subset of multidimensional data corresponding to the region 504. To generate a varied-scale-Mapper construct $\mathcal{M}$ as the varied-scale-topological construct 508, the topological data visualization system 106 constructs a nerve $\hat{M}$ comprising simplices corresponding to intersections between (i) a first set of clusters corresponding to a subset of multidimensional data from the region 504 and (ii) a second set of clusters corresponding to one or more subsets of multidimensional data outside the region 504.

In some embodiments, for example, the topological data visualization system 106 selects a region $\tilde{X}$ (e.g., the region 504) for magnification from the initial Mapper construct M, where the initial Mapper construct M comprises a set of nodes V. The selected region $\tilde{X}$ comprises a subset of nodes S and corresponds to a subset of multidimensional data. Consistent with the disclosure above, the topological data visualization system 106 projects the subset of multidimensional data corresponding to the selected region $\tilde{X}$ into a local lower-dimensional-image space $\tilde{Z}$ according to the following equations:

$$\tilde{X} = \cup_{w \in S} C_w \quad (8)$$

$$\tilde{Z} = f(\tilde{X}) \quad (9)$$

In equation (8), $C_w$ represents a cluster of multidimensional data corresponding to a node w. In equation (9), $f$ again represents a lens function.

Given a set of clusters $\mathcal{C}$ corresponding to the set of nodes V from the initial Mapper construct M, the topological data visualization system 106 identifies a preservation region X' to preserve an initial topological scale according to the following equation:

$$X' = X \setminus \tilde{X} \quad (10)$$

In equation (10), the preservation region X' represents the space X (and corresponding multidimensional dataset) not within the selected region $\tilde{X}$.

Based on the preservation region X' and the selected region $\tilde{X}$, the topological data visualization system 106 identifies a set of clusters $\mathcal{C}'$ of multidimensional data outside (and overlapping with) the selected region $\tilde{X}$ by removing the clusters completely inside the selected region $\tilde{X}$, as follows:

$$\mathcal{C}' = \{C \in \mathcal{C} : C \cap X' \neq \emptyset\} \text{ such that: } \cup_{C \in \mathcal{C}'} C \supseteq X' \quad (11)$$

According to equation (11), the set of clusters $\mathcal{C}'$ comprise those clusters within the preservation region X' but not completely inside the selected region $\tilde{X}$.

In addition to identifying the set of clusters $\mathcal{C}'$, the topological data visualization system 106 generates a local cover $\tilde{u}$ for the selected region $\tilde{X}$ on the local lower-dimensional-image space $\tilde{Z}$. Unlike some embodiments of the topological data visualization system 106 that partition the initial lower-dimensional-image space Z, in the embodiment indicated by FIG. 5, the local cover $\tilde{u}$ need not be restricted to the initial lower-dimensional-image space Z.

Similar to other covers, however, the local cover $\tilde{u}$ comprises multiple bins. The topological data visualization system 106 subsequently identifies (or creates) inverse images corresponding to each bin of the local cover $\tilde{u}$ and generates a set of clusters $\tilde{c}$ of multidimensional data for the inverse images corresponding to each bin. The set of clusters $\tilde{c}$ correspond to the selected region $\tilde{X}$ as follows:

$$\cup_{C \in \tilde{c}} C = \tilde{X} \quad (12)$$

According to equation (12), any cluster of multidimensional data forming the selected region $\tilde{X}$ is an element (or part) of the set of clusters $\tilde{c}$. The set of clusters $\tilde{c}$ effectively represents a local topological construct $\tilde{M}$ for a subset of multidimensional data corresponding to the selected region $\tilde{X}$.

Having generated both the set of clusters $\mathcal{C}'$ and the set of clusters $\tilde{c}$, the topological data visualization system 106 has identified an overall set of clusters $\hat{c}$ as a basis for computing a nerve $\hat{M}$, where the overall set of clusters $\hat{c}$ is defined as follows:

$$\hat{c} = \mathcal{C}' \cap \tilde{c} \text{ such that: } \cup_{C \in \hat{c}} C = X \quad (13)$$

As indicated by equation (13), the topological data visualization system 106 can compute a nerve $\hat{M}$ constituting a simplicial complex according to the overall set of clusters $\hat{c}$, where the nodes within the simplicial complex correspond to the overall set of clusters $\hat{c}$. To generate such a simplicial complex, the topological data visualization system 106 generates a k-dimensional simplex for every k+1 clusters from the overall set of clusters $\hat{c}$ comprising simultaneous intersections.

By computing the nerve $\hat{M}$ from the overall set of clusters $\hat{c}$, the topological data visualization system 106 generates a nerve that (i) represents the set of nodes V from preserved regions of the initial Mapper construct M at the initial topological scale and (ii) represents the subset of nodes S from the selected region $\tilde{X}$ at an alternative topological scale. The topological data visualization system 106 further replaces the subset of nodes S from the selected region $\tilde{X}$ with a local Mapper construct $\tilde{M}$ based on the set of clusters $\tilde{c}$. By imitating nerve construction with simultaneous intersections between the set of clusters $\mathcal{C}$ and the set of clusters $\tilde{c}$, the topological data visualization system 106 further glues (or stitches) together the preserved regions of the initial Mapper construct M and the local Mapper construct $\tilde{M}$ in a faithful representation of the topology from the multidimensional dataset in space X.

As suggested above, the topological data visualization system 106 may repeat the foregoing process by selecting (and generating additional sets of clusters of multidimensional data) for additional regions of the initial topological construct 502 according to equations (8)-(13). The topological data visualization system 106 can further determine additional simplices corresponding to intersections between the additional set of clusters and other sets of clusters to include in the nerve $\hat{M}$. As a result, the topological data visualization system 106 constructs a Mapper-like simplicial complex called a "Multimapper" or a varied-scale-Mapper construct $\mathcal{M}$.

Conceptually, the topological data visualization system 106 partitions (or breaks apart) a data point cloud for a multidimensional dataset lying in a space X into subsets of multidimensional data corresponding to multiple regions. The topological data visualization system 106 subsequently generates a local Mapper construct of an appropriate topological scale for a given region to form the varied-scale-Mapper construct $\mathcal{M}$. Formally, given a finite collection of subsets $\chi \subset 2^X$ such that $\cup_{Y \in \chi} Y = X$ and covers $\{\mathcal{U}_Y\}_{Y \in \chi}$ such that $\forall Y \in \chi$, $\mathcal{U}_Y \supseteq Y$, the topological data visualization system 106 defines a "Multimapper" or a varied-scale-Mapper construct $\mathcal{M}$ as follows:

$$\mathcal{M}_{(\chi, \{\mathcal{U}_Y\}_{Y \in \chi})} = N(\cup_{Y \in \chi} f^*(\mathcal{U}_Y)) \quad (14)$$

According to equation (14), the topological data visualization system 106 can generate a varied-scale-Mapper construct $\mathcal{M}$ comprising local Mapper constructs for different regions at different topological scales while retaining edges (and global relationships) between such different regions. FIG. 5 accordingly illustrates a varied-scale-Mapper construct $\mathcal{M}$ comprising one such local Mapper construct at a different topological scale. FIG. 2 illustrates a varied-scale-Mapper construct $\mathcal{M}$ comprising multiple local Mapper constructs at different topological scales. In both figures, the varied-scale-Mapper construct $\mathcal{M}$ constitutes a single topological visualization representing one or more regions (corresponding to subsets of a multidimensional data) at different topological scales. Such differing scales reveal new structure in magnified regions and avoids shattering of connections at a single topological scale, as can happen in a single Mapper construct for an entire multidimensional dataset.

Figure 6:
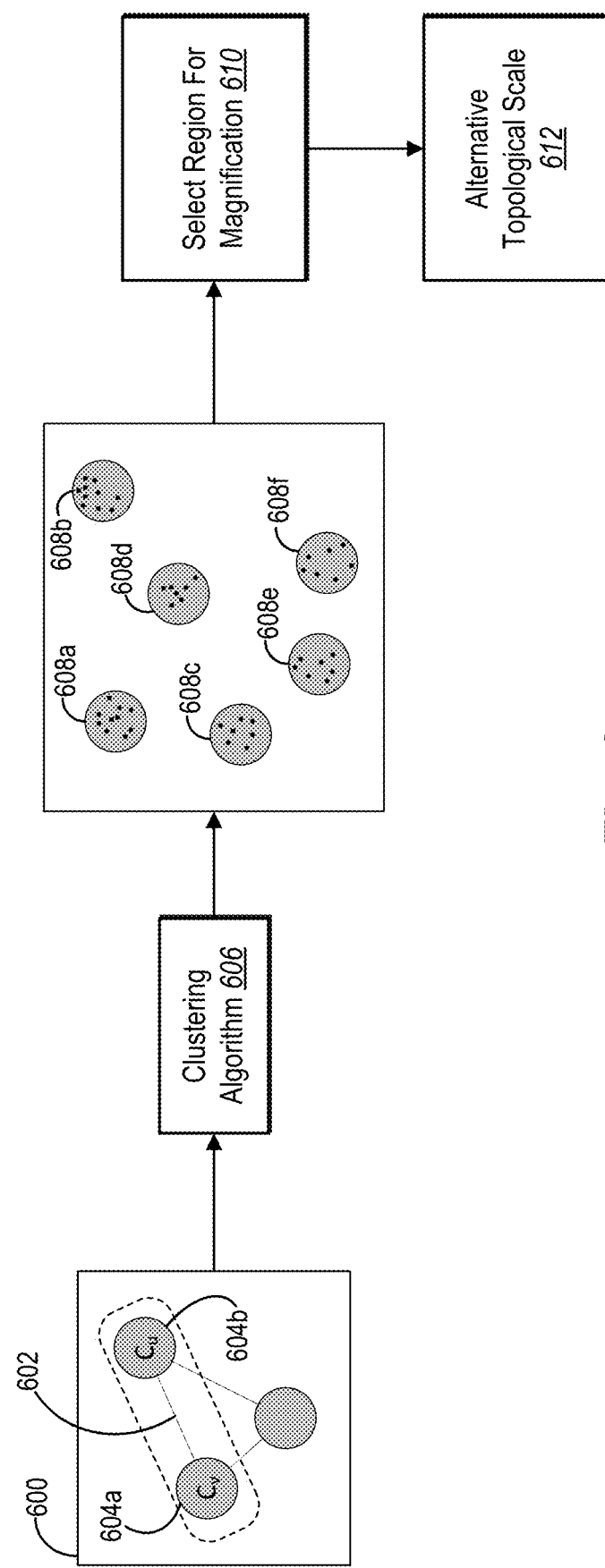
FIG. 6 illustrates a topological data visualization system selecting a region of an initial topological construct for magnification based on a contractibility violation in accordance with one or more embodiments.
Figure 7:
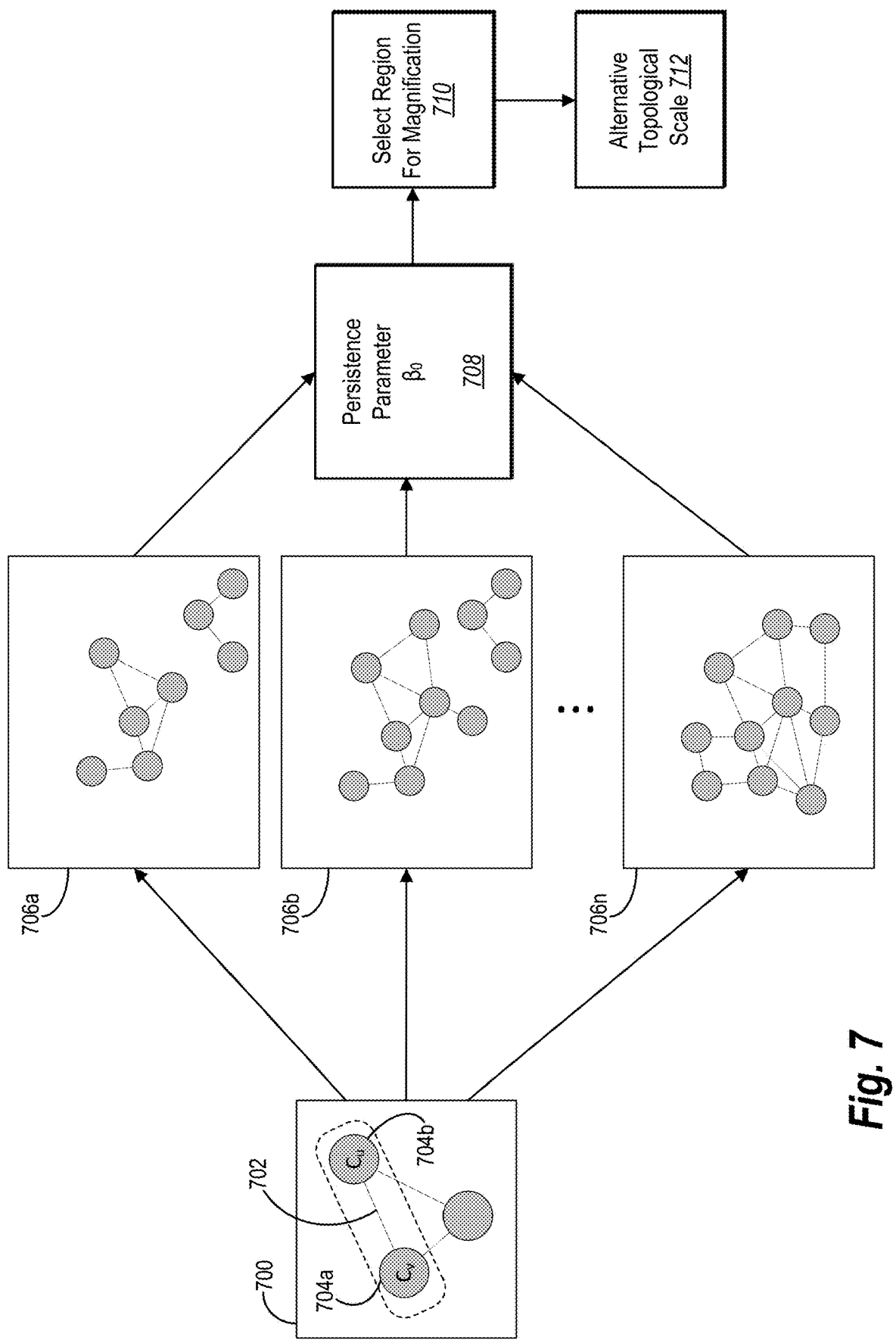
FIG. 7 illustrates a topological data visualization system selecting a region of an initial topological construct for magnification based on a persistence of an edge connecting nodes within the region, as found in multiple topological constructions, in accordance with one or more embodiments.

As noted above, the topological data visualization system 106 can both select a region of an initial topological construct for magnification and an alternative topological scale for a local topological construct corresponding to the selected region. For example, the topological data visualization system 106 can select a region for magnification (and an appropriate topological scale) based on a contractibility of the region or persistence of a structure within the region. FIGS. 6 and 7 illustrate embodiments of the topological data visualization system 106 selecting such a region and an alternative topological scale.

To select a region as indicated by FIG. 6, the topological data visualization system 106 identifies edges connecting nodes within a region (e.g., each edge within a region), applies a clustering algorithm to shared sets of multidimensional data corresponding to the nodes, and determines whether the resulting clusters of multidimensional data indicate a contractibility of nodes and edges within the region. When the clustering algorithm generates multiple clusters corresponding to an edge within the region—and determines that the multiple clusters violate a contractibility principle—the topological data visualization system 106 selects such a region for magnification at an alternative topological scale.

As shown in FIG. 6, for instance, the topological data visualization system 106 identifies an edge 602 connecting a first node 604a and a second node 604b within a region 600, applies a clustering algorithm 606 to a shared set of multidimensional data corresponding to the first node 604a and the second node 604b, and determines that resulting clusters 608a-608f of multidimensional data indicate that the edge 602 violates a contractibility principle. The topological data visualization system 106 subsequently selects the region 600 for magnification 610—and determines an alternative topological scale 612—based on determining that the edge 602 corresponding to the region 600 violates the contractibility principle.

As indicated by FIG. 6, the topological data visualization system 106 analyzes edges within the region 600 from an initial topological construct of a multidimensional dataset. To determine whether to select the region 600 for magnification, the topological data visualization system 106 identifies the edge 602 connecting the first node 604a and the second node 604b within the region 600, among other edges. The first node 604a corresponds to a first grouping (or a first cluster) of multidimensional data from a multidimensional dataset. Similarly, the second node 604b corresponds to a second grouping (or a second cluster) of multidimensional data from the multidimensional dataset.

As further indicated by FIG. 6, the topological data visualization system 106 applies the clustering algorithm 606 to a shared set of multidimensional data between the first and second groupings (or first and second clusters) of multidimensional data corresponding to the first node 604a and the second node 604b. For instance, the topological data visualization system 106 may apply Density-Based Spatial Clustering of Applications with Noise ("DBSCAN") to the shared set of multidimensional data between the first and second groupings. Based on applying the clustering algorithm 606, the topological data visualization system 106 generates the clusters 608a-608f of multidimensional data from the shared set of multidimensional data corresponding to the edge 602.

By generating the clusters 608a-608f of multidimensional data from the shared set of multidimensional data, the topological data visualization system 106 identifies that multiple edges could be generated to connect the first and second groupings of multidimensional data in a different representation of nodes and that the edge 602 connecting the first node 604a and the second node 604b cannot be contracted (at a coarser topological scale) into a single node or other structure. The topological data visualization system 106 can, therefore, represent more detailed connections between the first and second groupings of multidimensional data at a magnified (or finer) topological scale. Based on determining that the clusters 608a-608f of multidimensional data indicate a contractibility violation, the topological data visualization system 106 selects the region 600 for magnification 610.

Having selected the region 600, the topological data visualization system 106 further identifies a topological scale at which a topological construct would demonstrate contractibility for a subset of multidimensional data corresponding to the region 600. As explained further below, the topological data visualization system 106 accordingly selects the topological scale demonstrating contractibility as the alternative topological scale 612 for a local topological construct corresponding to the region 600.

In some embodiments, the topological data visualization system 106 uses the concepts of a Reeb graph and the Mapper algorithm to select a region of an initial Mapper construct for magnification. When applying the Mapper algorithm with a 1-dimensional lens function, the Mapper construct ideally converges to a Reeb graph of an original space. In topological data analysis, the concept of a Mapper construct converging to a generalization of a Reeb graph is called a Reeb space. While a point cloud could not converge to a Reeb graph in practice, topological data analysis can use the concept of a Reeb space as a measure of a Mapper construct's accuracy. In particular, an accurate Mapper construct (or an accurate region of an initial Mapper construct) for a multidimensional dataset under a particular lens function $f$ should be similar in shape to a Reeb space (under the lens function $f$) of the connected paracompact space it approximates.

In some cases, topological data analysis uses a more formal definition of Reeb space. Given a continuous map $f: X \rightarrow Y$ between topological spaces X and Y, the Reeb Space $R_f(X)$ of X with respect to a lens function $f$ constitutes $X/\sim$, where the equivalence relation $\sim$ on X is defined as $p \sim q$ if p and q lie in the same connected component of $f^{-1}(c)$ for some $c \in Y$. In practice, when space $Y=\mathbb{R}^n$, the connected components are the same as path-connected components, which enables topological data analysis to use a Reeb space as a measure of accuracy. When space $Y=\mathbb{R}$, the Reeb space is called the Reeb graph. To identify regions of an initial Mapper construct at too coarse a topological scale (i.e., a bad region of a Mapper construct), the topological data visualization system 106 identifies and selects regions of the initial Mapper construct that violate the contractibility principle of the Nerve Theorem.

Applying and checking for contractibility can be complicated in practice, particularly when visualizing a point cloud representing a multidimensional dataset. To apply contractibility to such a point cloud, however, the topological data visualization system 106 can rely on an analogy between a continuous space and a multidimensional discrete point cloud from the Mapper algorithm. In such an analogy, a paracompact space corresponds to a point cloud, path-connected components correspond to clusters of multidimensional data, and a nerve corresponds to a Mapper construct.

In terms of a continuous space, if a space has more than one path-connected component, the space is not contractible. Contracting (or shrinking) separate structures to a same point would require contracting across a gap between the separate structures. By analogy in a point cloud setting, if a subset of multidimensional data corresponds to multiple clusters, the corresponding space is not contractible. Based on such an analogy, the topological data visualization system 106 can determine whether a region (or nodes and edges within a region) are contractible using the following general characterization. Given an initial Mapper construct M on a set of nodes V:

$$\exists \sigma \in M, \sigma = \sigma(S), S \subseteq V, \beta_0(\cap_{v \in S} C_v) > 1 \qquad (15)$$

In equation (15), $\sigma(S)$ represents a simplex on the subset of nodes S, and $C_v$ represents a cluster corresponding to a node v of the nerve of the initial Mapper construct M. For a given topological space A, $\beta_0$ (A) represents the number of connected components in the topological space topological space A. Accordingly, the topological data visualization system 106 can determine the number of connected components $\beta_0$ for a topological space in which the node v is part of the subset of nodes S. Based on equation (15), the topological data visualization system 106 can apply a clustering algorithm in a discrete setting (i.e., with a point cloud for a multidimensional dataset) to identify whether a region (or nodes and edges within a region) are contractible or not contractible.

In some embodiments, given an initial Mapper construct M, for each edge $(\mu, \nu)$, the topological data visualization system 106 applies a clustering algorithm within $C_\mu \cap C_\nu$, where $C_\mu \cap C_\nu \neq \emptyset$. In other words, the topological data visualization system 106 applies a clustering algorithm to a shared set of multidimensional data shared between the clusters $C_\mu$ and $C_\nu$. In some such cases, the topological data visualization system 106 applies DBSCAN as the clustering algorithm because such an algorithm does not limit (or set) a number of clusters before application. Alternatively, the topological data visualization system 106 can apply any density-based clustering algorithm to a shared set of multidimensional data, such as Hierarchical Density-Based Spatial Clustering of Applications with Noise ("HDB SCAN") or Ordering Points to Identify the Clustering Structure ("OPTICS"). When the topological data visualization system 106 generates a single cluster, it identifies the edge ($\mu$, $\nu$) as demonstrating contractibility. By contrast, when the topological data visualization system 106 generates multiple clusters, it identifies a contractibility violation for a particular region comprising the edge ($\mu$, $\nu$). Based on multiple clusters indicating a contractibility violation, the topological data visualization system 106 selects a region of the initial Mapper construct M corresponding to the edge ($\mu$, $\nu$) for magnification.

When an edge ($\mu$, $\nu$) indicates a contractibility violation, the continuous space $C_\mu \cap C_\nu$ comprises more than one path-connected component. Because collapsing each path-connected component within $C_\mu \cap C_\nu$ results in a Reeb space, the Reeb space for $C_\mu \cap C_\nu$ under such conditions also comprises more than one path-connected component. As suggested above, when an initial Mapper construct M (or region thereof) is restricted to $C_\mu \cap C_\nu$, the initial Mapper construct M comprises precisely an edge ($\mu$, $\nu$)—a single path-connected component. Accordingly, when clustering within $C_\mu \cap C_\nu$ for an edge ($\mu$, $\nu$) indicates multiple path-connected components and a contractibility violation, the region of the initial Mapper construct M deviates from a corresponding Reeb space. As indicated above and as illustrated in FIG. 6, in some embodiments, the topological data visualization system 106 selects such a region for magnification at an alternative topological scale.

Having selected the region for magnification, in certain implementations, the topological data visualization system 106 further identifies a topological scale at which a local Mapper construct $\tilde{M}$ for a subset of multidimensional data corresponding to the selected region demonstrates contractibility. In some cases, the topological data visualization system 106 selects a topological scale resulting in a local Mapper construct $\tilde{M}$ nearest to the Reeb space for the selected region. Consistent with the disclosure above, the topological data visualization system 106 can select a topological scale for the selected region where a clustering algorithm applied to $C_\mu \cap C_\nu$ for an edge ($\mu$, $\nu$) results in a single cluster of multidimensional data. The topological data visualization system 106 selects such a topological scale as an alternative topological scale for the local Mapper construct $\tilde{M}$ corresponding to the selected region.

While the cluster-based-region selection depicted in FIG. 6 identifies regions for magnification, the topological data visualization system 106 uses a clustering algorithm (or selects a clustering algorithm) in such embodiments that may be more suitable for some multidimensional datasets than others. Instead of cluster-based-region selection, in some embodiments, the topological data visualization system 106 selects regions for magnification by generating and analyzing multiple topological constructs corresponding to edges within different regions of an initial topological construct.

To select a region as indicated by FIG. 7, for example, the topological data visualization system 106 identifies edges connecting nodes within a region (e.g., each edge within a region), generates multiple topological constructs at different topological scales corresponding to each edge, and determines whether components of simplicial complexes corresponding to each edge are present (e.g., persistent) within the multiple topological constructs. When multiple disconnected components corresponding to an edge within the multiple topological constructs indicate a violation of a component-persistence threshold, the topological data visualization system 106 selects the region comprising the edge for magnification at an alternative topological scale.

As shown in FIG. 7, the topological data visualization system 106 identifies an edge 702 connecting a first node 704a and a second node 704b within a region 700, generates topological constructs 706a-706n corresponding to the edge 702 at different topological scales, and determines that multiple disconnected components corresponding to the edge 702 within the topological constructs 706a-706n indicate a violation of a component-persistence threshold (e.g., disconnected components of simplicial complexes). The topological data visualization system 106 subsequently selects the region 700 corresponding to the edge 702 connecting the first node 704a and the second node 704b for magnification—and determines an alternative topological scale 712—based on determining that multiple disconnected components corresponding to the edge 702 in the topological constructs 706a-706n do not satisfy the component-persistence threshold.

As indicated by FIG. 7, the topological data visualization system 106 analyzes edges within the region 700 from an initial topological construct of a multidimensional dataset—including the edge 702 connecting the first node 704a and the second node 704b. Based on groupings (or clusters) of multidimensional data corresponding to the first node 704a and the second node 704b, the topological data visualization system 106 generates the topological constructs 706a-706n at different topological scales, such as by applying a Multiscale Mapper algorithm. As shown in FIG. 7, for instance, each of the topological constructs 706a, 706b, and 706n include various nodes and edges representing the groupings (or clusters) of multidimensional data corresponding to the first node 704a and the second node 704b, but at different topological scales.

Having generated the topological constructs 706a-706n, the topological data visualization system 106 identifies (or counts) disconnected components corresponding to the edge 702 within the topological constructs 706a-706n. As shown in FIG. 7, for example, the topological data visualization system 106 may determine a persistence parameter 708 identifying a number of disconnected components from the groupings of multidimensional data corresponding to the edge 702 within the topological constructs 706a-706n. Both the topological construct 706a and the topological construct 706b, for instance, include disconnected components of simplicial complexes from the groupings of multidimensional data corresponding to the edge 702.

As further indicated by FIG. 7, the topological data visualization system 106 determines that the disconnected components corresponding to the edge 702 within the topological constructs 706a-706n indicate a violation of a component-persistence threshold. Such a component-persistence threshold may comprise a particular amount or number of disconnected components comprising edges and nodes within the topological constructs 706a-706n. In some such embodiments, the topological data visualization system 106 determines that the persistence parameter 708 does not satisfy a threshold number of connected components. Based on identifying a violation of the component-persistence threshold, the topological data visualization system 106 selects the region 700 for magnification 710, where the region 700 corresponds to the edge 702 connecting the first node 704a and the second node 704b.

Having selected the region 700, the topological data visualization system 106 further identifies a topological scale at which a topological construct for the region 700 would demonstrate contractibility for a subset of multidimensional data corresponding to the region 700. As explained further below, the topological data visualization system 106 accordingly selects a topological scale satisfying the component-persistence threshold as the alternative topological scale 712 for a local topological construct corresponding to the region 700.

As suggested above, in some embodiments, the topological data visualization system 106 uses a Multiscale Mapper algorithm to generate multiple Mapper constructs for an edge connecting nodes. In general, the Multiscale Mapper algorithm generates a tower of covers of different topological scales and analyzes variations in the resulting tower of nerves for multiple Mapper constructs. As used in this disclosure, the term "tower" refers to a series or collection of covers, nerves, simplicial complexes, or other objects. This disclosure summarizes concepts related to the Multiscale Mapper algorithm below based in part on Tamal K. Dey et al., "Multiscale Mapper: Topological Summarization via Codomain Covers," *Proceedings of the Twenty-Seventh Annual ACM-SIAM Symposium on Discrete Algorithms* (2016) (hereinafter, "Dey"), the entire contents of which are incorporated by reference.

In the Multiscale Mapper algorithm, a tower $\mathfrak{W}$ of objects with resolution $res(\mathfrak{W})=r\in\mathbb{R}$ constitutes a collection $\mathfrak{W}=\{W_\varepsilon\}_{\varepsilon\geq r}$ of objects $W_\varepsilon$ together with maps $w_{\varepsilon,\varepsilon'}$: $W_\varepsilon \to W'_\varepsilon$, such that $w_{\varepsilon,\varepsilon}=id$ and $w_{\varepsilon\varepsilon''}=w_{\varepsilon',\varepsilon''}\circ w_{\varepsilon,\varepsilon'}$ for all $r\leq\varepsilon\leq\varepsilon'\leq\varepsilon''$. In this definition of a tower $\mathfrak{W}$, r represents a bin diameter and $\varepsilon$ represents a topological scale. Accordingly, $\varepsilon$, $\varepsilon'$, and $\varepsilon''$ each represent different topological scales.

As defined in the Multiscale Mapper algorithm, given a cover $\mathcal{U}=\{U_a\}_{a\in A}$ and a cover $v=\{V_b\}_{b\in B}$, a map of covers from $\mathcal{U}$ to $v$ constitutes a set map $\xi:A\to B$, such that $\underline{\mathsf{C}}a\in A$, $\mathcal{U}_a\subseteq v_{\xi(a)}$. By abuse of notation, $\xi$ also represents an induced map $\mathcal{U}\to v$. In a tower $\mathfrak{W}$ where objects $W_\varepsilon$ constitute covers and maps $w_{\varepsilon,\varepsilon'}$ constitute maps of covers, therefore, $\mathfrak{W}$ is called a tower of covers in the Multiscale Mapper algorithm.

As further defined in the Multiscale Mapper algorithm, given two simplicial complexes K and L, a simplicial map from K to L is a map $\xi:K\to L$, such that, for each vertex $v_k\in K$, a map for $\xi(v_K)\in L$ also constitutes a vertex and, for each simplex $\sigma$ comprising vertices $\{v_0, \ldots, v_k\}$, a map for $\xi(\sigma)\in L$ also comprises vertices $\{\xi(v_0), \ldots, \xi(v_k)\}$. Note that if $\xi$ is not injective on vertices, then a k-dimensional simplex might map to a k'-dimensional simplex, where k<k'. In a tower $\mathfrak{W}$ where the objects $W_\varepsilon$ are simplicial complexes and maps $w_{\varepsilon,\varepsilon'}$ are simplicial maps, $\mathfrak{W}$ is called a tower of simplicial complexes in the Multiscale Mapper algorithm.

To define a Multiscale Mapper based on Dey, given a space X, a lens function $f$, and a tower of covers $\{\mathcal{U}_\varepsilon\}_\varepsilon$ of $f(X)$, a Multiscale Mapper MM is defined as:

$$MM(X, \mathcal{U}, f) = \{M(X, \mathcal{U}, f): \mathcal{U}\in\mathfrak{U}\} \quad (16)$$

For purposes of simplicity, this disclosure generally refers to a Multiscale Mapper $MM(X, \mathcal{U}, f)$ as simply MM without reference to X, $\mathcal{U}$, or $f$ from equation (16).

As suggested by equation (16), a successive relationship of $f(X)$ within $\mathcal{U}$ corresponds to a successive relationship of Mapper constructs M within Multiscale Mapper $MM(\mathcal{U})$. The following correlations demonstrate the correspondence of such successive relationships. A map of covers $\xi: \mathcal{U}\to v$ induces a simplicial map $N(\xi): N(\mathcal{U})\to N(v)$ by the following rule: if a vertex $u\in N(\mathcal{U})$ corresponds to $U\in\mathcal{U}$ and a vertex $v\in N(v)$ corresponds to $V\in v$, such that $\xi(U)=V$, then $N(\xi)(\mu)=v$. Further, if $\mathcal{U}_{43}\xrightarrow{\xi}v_{43}\xrightarrow{\zeta}W$ are maps between covers, then $N(\zeta\bullet\xi)=N(f)\bullet(\xi)$. Accordingly, a tower of covers induces (or leads to) a corresponding tower of simplicial complexes—that is, the nerves of each cover. A map of covers $\xi: \mathcal{U} \to \mathcal{V}$ accordingly induces a map of covers between their respective pullback covers under a lens function $f$, as follows:

$$f^*(\xi): f^*(\mathcal{U}) \to f^*(\mathcal{V}) \qquad (17)$$

Turning back to the concept of a pullback cover, the pullback cover under $f: X \to Z$ of a tower of covers $\mathcal{U} = \{\mathcal{U}_\varepsilon\}_\varepsilon$ of Z is defined as follows:

$$f^*(\mathcal{U}) = f(\{\mathcal{U}_\varepsilon\}_\varepsilon) = \{f^*(\mathcal{U}_\varepsilon)\}_\varepsilon \qquad (18)$$

Based on equation (18), the pullback cover $f^*(\mathcal{U})$ is itself a valid tower of covers via the induced maps described above.

Relying in part on the Multiscale Mapper algorithm, in some embodiments, the topological data visualization system 106 performs a clustering-independent-region selection depicted in FIG. 7. In some such cases, the topological data visualization system 106 relies on a concept of persistence from topological data analysis, as applied to a point cloud for a multidimensional dataset. As described in Dey, given a tower of covers $\mathcal{U} = \{\mathcal{U}_\varepsilon\}_\varepsilon$, a persistence algorithm can compute a persistence diagram of a resulting Multiscale Mapper MM. Such a computation can apply to a discrete point cloud, such as a point cloud for a multidimensional dataset.

In particular, given a tower of covers $\mathcal{U} = \{\mathcal{U}_\varepsilon\}_\varepsilon$, a Multiscale Mapper MM, and a void H appearing in some Mapper construct M, the topological data visualization system 106 determines a range of topological scales at which a connected component is visible, as represented by a birth when the connected component is first visible and a death when the connected component is last visible: (i) birth (H)=min{$\varepsilon$: H appears in M($\mathcal{U}_\varepsilon$)} and (ii) death (H)=max{$\varepsilon$: H appears in M($\mathcal{U}_\varepsilon$)}. For every 0-dimensional void (e.g., a connected component) and 1-dimensional void (e.g., a circular hole) that appears in Multiscale Mapper MM($\mathcal{U}$), the topological data visualization system 106 can determine such a birth-death pair—that is, a range of topological scales at which the 0-dimensional void or 1-dimensional void is visible in the corresponding Mapper constructs M.

By applying such a range of topological scales, in some embodiments, the topological data visualization system 106 counts a topological feature (e.g., a void) as truly present when instances of the topological features are persistent for a threshold range of topological scales. If $\beta_m^\varepsilon$ represents a number of m-dimensional voids at a topological scale $\varepsilon$, the topological data visualization system 106 removes noisy features and determines a true number of m-dimensional voids for persistence, as follows:

$$\phi_m: \mathbb{N} \to \mathbb{N} \ \beta \mapsto |\{\varepsilon: \beta_m^\varepsilon = \beta\}| \beta_m = \arg\max(\phi_m) \qquad (19)$$

Because $\beta_0$ represents a number of connected components, the topological data visualization system 106 can determine a number of connected components (and persistence within Mapper constructs M from a Multiscale Mapper MM) without using a clustering algorithm. As used herein, the symbol $\beta_0$ accordingly represents a persistence parameter, such as the persistence parameter 708 shown in FIG. 7.

In particular, given a Mapper construct M (X, $\mathcal{U}$, $f$), for each edge ($\mu$, $\nu$), the topological data visualization system 106 optionally generates a tower of cover on $C_\mu \cap C_\mu$, beginning from $f^*(\mathcal{U})|_{C_\mu \cap C_\nu}$ and decreasing the topological scale of cover up to a threshold or refining $f^*(\mathcal{U})|_{C_\mu \cap C_\nu}$ by a factor of 2. In practice, when $\mathcal{U}|_{f(C_\mu \cap C_\nu)}$ comprises cuboidal² bins of diameter $\varepsilon_0$ and when $\mathcal{U}'$ is finite, the topological data visualization system 106 defines covers of the form $\mathcal{U}_\varepsilon$ of $f(X)$ to have the same partition rule as $\mathcal{U}$, but with a topological scale $\varepsilon$ for a bin. The tower of covers of $f(C_\mu \cap C_\nu)$ is accordingly represented as follows:

$$\mathcal{U}' = \{\mathcal{U}_\varepsilon\}_{\varepsilon \in \mathbb{N} \ 0.5\varepsilon_0 \leq \varepsilon \leq \varepsilon_0} \qquad (20)$$

Based on equation (20), the topological data visualization system 106 determines a pullback tower $f^*(\mathcal{U}')$ of covers of $C_\mu \cap C_\nu$. Based on the pullback tower $f^*(\mathcal{U}')$ of covers of $C_\mu \cap C_\nu$, the topological data visualization system 106 determines a number of connected components $\beta_0$ representing persistence.

As suggested above, the topological data visualization system 106 optionally uses a value for $\beta_0$ as component-persistence threshold. For example, if $\beta_0 < 1$, the number of components identified for an edge ($\mu$, $\nu$) do not violate a component-persistence threshold. If $\beta_0 > 1$, however, the number of components identified for an edge ($\mu$, $\nu$) violate the component-persistence threshold. Based on determining that the number of components corresponding to the edge ($\mu$, $\nu$) violate the component-persistence threshold, the topological data visualization system 106 selects a region comprising the edge ($\mu$, $\nu$) for magnification at an alternative topological scale.

Having selected the region for magnification, in certain implementations, the topological data visualization system 106 further identifies a topological scale at which a Mapper construct M for a subset of multidimensional data corresponding to the selected region satisfies the component-persistence threshold. In some cases, the topological data visualization system 106 selects a topological scale at which a corresponding Mapper construct M comprises edges and nodes that persistently appear within individual Mapper constructs M of the Multiscale Mapper MM. The topological data visualization system 106 accordingly selects such a topological scale as an alternative topological scale for the local Mapper construct $\tilde{M}$ corresponding to the selected region. In some implementations, the topological data visualization system 106 uses such clustering-independent-region selection to select the region 700 and the alternative topological scale 712, as depicted in FIG. 7.

Figure 8A:
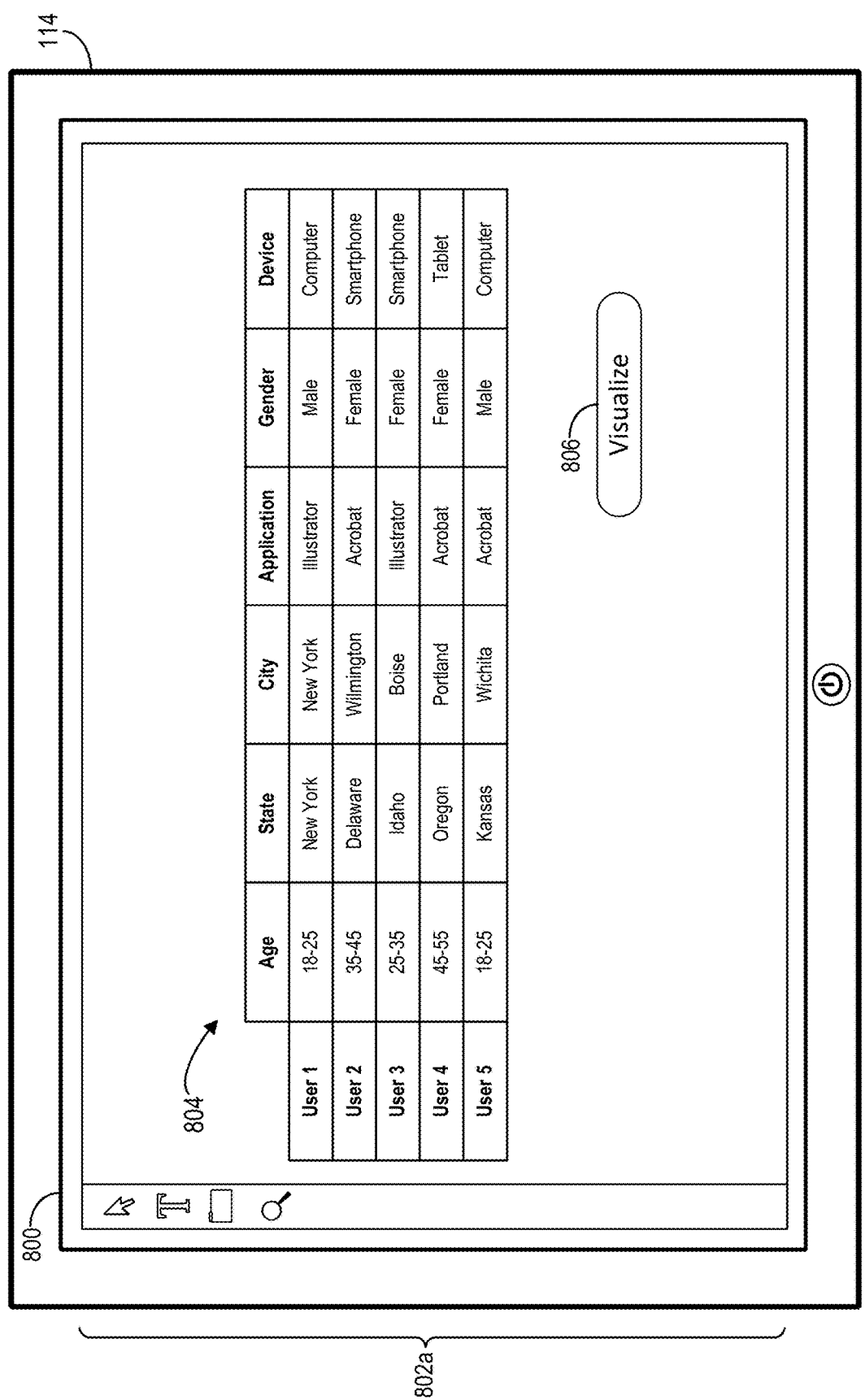
FIGS. 8A-8B illustrate a computing device detecting a user input requesting a visualization of a multidimensional dataset and rendering a topological visualization of a varied-scale-topological construct for the multidimensional dataset in response to the user input in accordance with one or more embodiments.
Figure 8B:
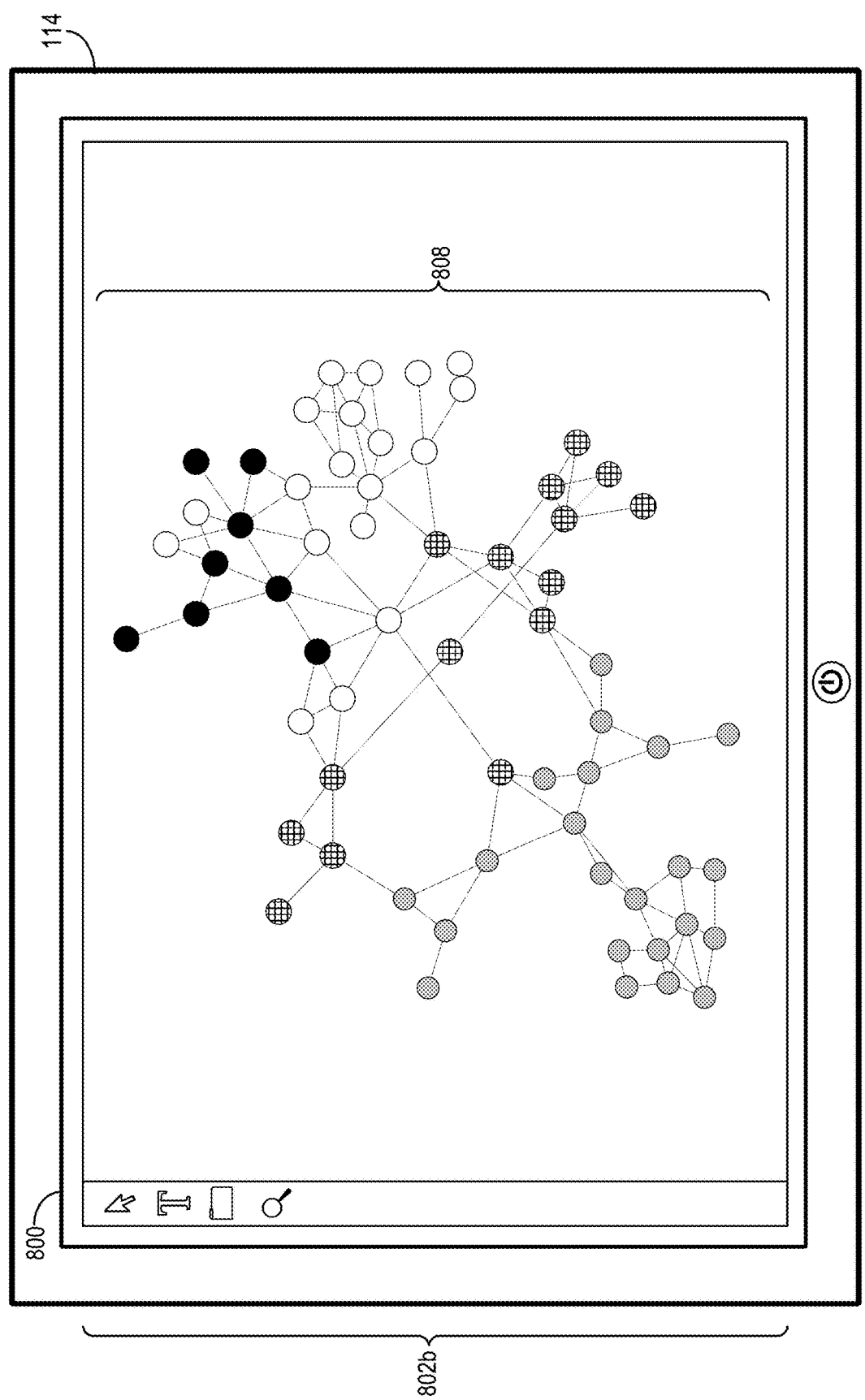

As noted above, in certain embodiments, the topological data visualization system 106 can both generate and render a varied-scale-topological construct in a graphical user interface. FIGS. 8A-8B illustrate the administrator device 114 presenting graphical user interfaces comprising a multidimensional dataset and a topological visualization for a varied-scale-topological construct. As described below, FIGS. 8A-8B depict graphical user interfaces from the perspective of the administrator device 114 implementing computer-executable instructions of the analytics application 116 to perform certain actions for the topological data visualization system 106. In FIGS. 8A-8B, the administrator device 114 may detect any suitable user interaction, including, but not limited to, an audio input into a microphone, a keyboard input, a mouse click, a stylus interaction with a touch screen, or a touch gesture with a touch screen.

As shown in FIG. 8A, for instance, the administrator device 114 presents a graphical user interface 802a of the analytics application 116 within a screen 800. The graphical user interface 802a includes a multidimensional-data graphic 804 for a multidimensional dataset. In this particular embodiment, the administrator device 114 presents a portion of the multidimensional dataset in the multidimensional-data graphic 804 as a table. Because of space constraints, the multidimensional-data graphic 804 includes only some of the values (e.g., age, state, city, application, gender, and device) corresponding to each data sample (e.g., user). In additional embodiments, the topological data visualization system 106 may provide other graphical representations for the multidimensional dataset, such as a chart, graph, or any other suitable visualization.

As further shown in FIG. 8A, the graphical user interface 802a includes a visualization option 806. Upon detecting a selection by the administrator 118 of the visualization option 806, the administrator device 114 sends a data request for a topological visualization of the multidimensional dataset to the topological data visualization system 106. Upon receiving the topological-visualization request, the topological data visualization system 106 generates a varied-scale-topological construct for the multidimensional dataset consistent with the disclosure above. The topological data visualization system 106 further sends data comprising computer-executable instructions to the administrator device 114 that, when executed by a processor, cause the administrator device 114 to present a topological visualization of the varied-scale-topological construct.

As shown in FIG. 8B, the administrator device 114 presents a topological visualization 808 within a graphical user interface 802b of the analytics application 116. As indicated by the topological visualization 808, the corresponding varied-scale-topological construct for the multidimensional data comprises various regions corresponding to subsets of multidimensional data from the multidimensional dataset. Consistent with the disclosure above, the topological visualization 808 represents such multidimensional-data subsets as nodes and edges at different topological scales. Such a varied-scale-topological construct captures connections and patterns among the multidimensional dataset not captured by conventional tables or graphs of the multidimensional dataset or conventional topological visualizations of the multidimensional dataset.

Figure 9:
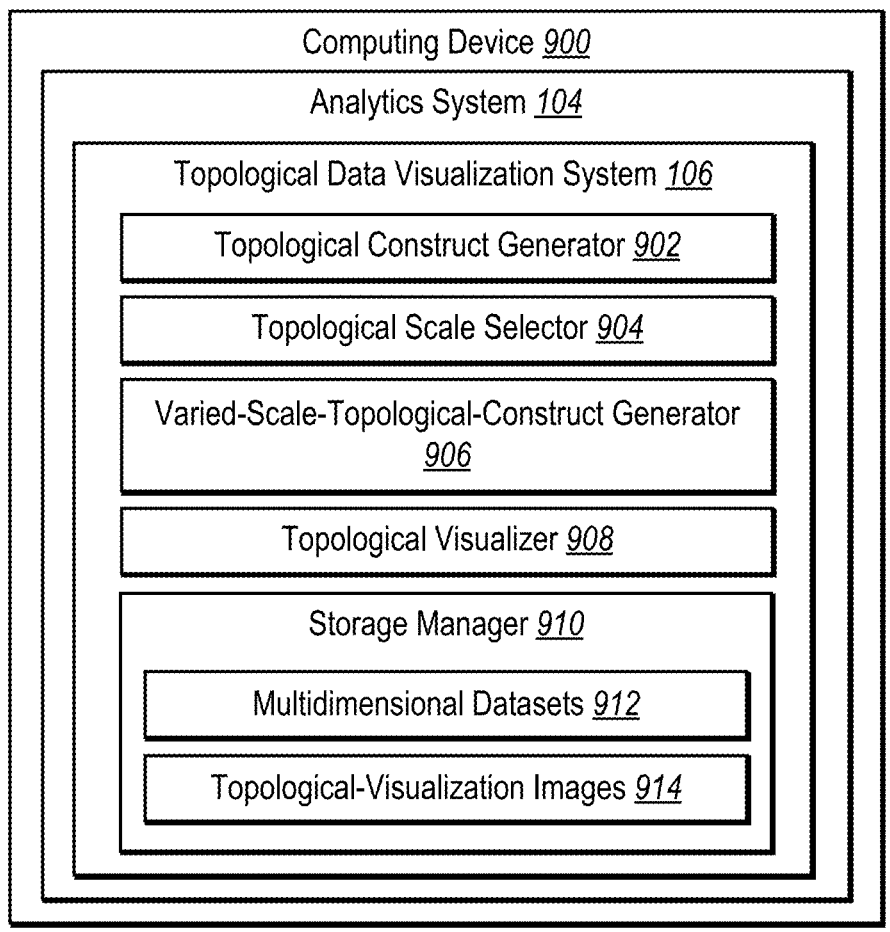
FIG. 9 illustrates a schematic diagram of a topological data visualization system of FIG. 1 in accordance with one or more embodiments.

Turning now to FIG. 9, this figure provides additional detail regarding components and features of the topological data visualization system 106. In particular, FIG. 9 illustrates a computing device 900 implementing the analytics system 104 and the topological data visualization system 106. In some embodiments, the computing device 900 comprises one or more servers (e.g., the server(s) 102). In other embodiments, the computing device 900 comprises one or more client devices (e.g., the administrator device 114).

As shown in FIG. 9, the computing device 900 includes the analytics system 104. In some embodiments, the analytics system 104 uses its components to perform various digital-analytics functions or digital-campaign functions. Additionally, in some cases, the analytics system 104 collects data corresponding to attributes, characteristics, or features of users (or devices) from the client devices 120a-120n (e.g., by collecting data tracking application uses, orders, purchases, or webpage views).

As further shown in FIG. 9, the computing device 900 includes the topological data visualization system 106. The topological data visualization system 106 includes, but is not limited to, a topological construct generator 902, a topological scale selector 904, a varied-scale-topological-construct generator 906, a topological visualizer 908, and/or a storage manager 910. The following paragraphs describe each of these components in turn.

As just mentioned, the topological data visualization system 106 includes the topological construct generator 902. The topological construct generator 902 generates topological constructs. For example, in some embodiments, the topological construct generator 902 communicates with the storage manager 910 to access a multidimensional dataset from the multidimensional datasets 912. The topological construct generator 902 can further generate an initial topological construct for the multidimensional dataset and a local topological construct for a subset of multidimensional data. In some such embodiments, the topological construct generator 902 generates an initial topological construct and a local topological construct as illustrated in FIGS. 3 and 5.

As further shown in FIG. 9, the topological scale selector 904 selects regions of an initial topological construct for magnification and an alternative topological scale for a local topological construct. For example, in some embodiments, the topological scale selector 904 selects a region of an initial topological construct based on a relative data density of a subset of multidimensional data corresponding to the region in comparison to other regions. In some cases, the topological scale selector 904 identifies a topological scale at which a topological construct for a subset of multidimensional data demonstrates contractibility (or satisfies a component-persistence threshold) to select an alternative topological scale for a local topological construct corresponding to the selected region for magnification. In some such embodiments, the topological scale selector 904 selects regions of an initial topological construct for magnification and an alternative topological scale for a local topological construct as illustrated in FIGS. 6 and 7. The topological scale selector 904 further communicates with the storage manager 910 to access a multidimensional dataset from the multidimensional datasets 912.

As further shown in FIG. 9, the varied-scale-topological-construct generator 906 generates varied-scale-topological constructs for multidimensional datasets. For example, in some embodiments, the varied-scale-topological-construct generator 906 combines one or more local topological constructs for one or more subsets of multidimensional data with an initial topological construct for a multidimensional dataset to generate a varied-scale-topological construct for the multidimensional dataset. As another example, the varied-scale-topological-construct generator 906 can identify a first set of nodes corresponding to a first subset of multidimensional data and a second subset of nodes corresponding to a second subset of multidimensional data and determine edges for a varied-scale-topological construct corresponding to intersections between nodes from the first and second set of nodes. In some such embodiments, the varied-scale-topological-construct generator 906 generates a varied-scale-topological construct for a multidimensional dataset as illustrated in FIGS. 3 and 5. In some embodiments, the varied-scale-topological-construct generator 906 further communicates with the storage manager 910 to access a multidimensional dataset from the multidimensional datasets 912.

As further shown in FIG. 9, the topological visualizer 908 provides or generates topological visualizations of varied-scale-topological constructs based on a topological-visualization request or data-visualization request. For example, in some embodiments, the topological visualizer 908 renders (or generates) a topological visualization of a varied-scale-topological construct for presentation within a graphical user interface. As another example, in certain implementations, the topological visualizer 908 generates and sends data comprising computer-executable instructions to a computing device that, when executed by a processor, cause the computing device to present a topological visualization of the varied-scale-topological construct. In some such embodiments, the varied-scale-topological-construct generator 906 generates a topological visualization for a varied-scale-topological construct as illustrated in FIG. 8B. In some embodiments, the topological visualizer 908 further communicates with the storage manager 910 to access or store topological visualization as topological-visualization images 914.

In addition (or in the alternative) to the topological construct generator 902, the topological scale selector 904, the varied-scale-topological-construct generator 906, and the topological visualizer 908, in some embodiments, the storage manager 910 accesses and/or maintains the multidimensional datasets 912 and the topological-visualization images 914. In some such embodiments, for instance, the storage manager 910 maintains the multidimensional datasets 912 by topic, identifier, client, or other organizational entity and maintains the topological-visualization images 914 by multidimensional dataset.

In one or more embodiments, each of the components of the topological data visualization system 106 are in communication with one another using any suitable communication technologies. Additionally, the components of the topological data visualization system 106 can be in communication with one or more other devices including one or more client devices described above. Although the components of the topological data visualization system 106 are shown to be separate in FIG. 9, any of the subcomponents may be combined into fewer components, such as into a single component, or divided into more components as may serve a particular implementation. Furthermore, although the components of FIG. 9 are described in connection with the topological data visualization system 106, at least some of the components for performing operations in conjunction with the topological data visualization system 106 described herein may be implemented on other devices within the environment 100.

Each of the components 902-914 of the topological data visualization system 106 can include software, hardware, or both. For example, the components 902-914 can include one or more instructions stored on a computer-readable storage medium and executable by processors of one or more computing devices, such as a client device or server device. When executed by the one or more processors, the computer-executable instructions of the topological data visualization system 106 can cause the computing device(s) to perform the methods described herein. Alternatively, the components 902-914 can include hardware, such as a special-purpose processing device to perform a certain function or group of functions. Alternatively, the components 902-914 of the topological data visualization system 106 can include a combination of computer-executable instructions and hardware.

Furthermore, the components 902-914 of the topological data visualization system 106 may, for example, be implemented as one or more operating systems, as one or more stand-alone applications, as one or more generators of an application, as one or more plug-ins, as one or more library functions or functions that may be called by other applications, and/or as a cloud-computing model. Thus, the components 902-914 may be implemented as a stand-alone application, such as a desktop or mobile application. Furthermore, the components 902-914 may be implemented as one or more web-based applications hosted on a remote server. The components 902-914 may also be implemented in a suite of mobile device applications or "apps." To illustrate, the components 902-914 may be implemented in a software application, including, but not limited to, ADOBE EXPERIENCE CLOUD, ADOBE MARKETING CLOUD, ADOBE CAMPAIGN, and ADOBE ANALYTICS. "ADOBE," "EXPERIENCE CLOUD," "CAMPAIGN," "MARKETING CLOUD," and "ANALYTICS" are either registered trademarks or trademarks of Adobe, Inc. in the United States and/or other countries.

Figure 10:
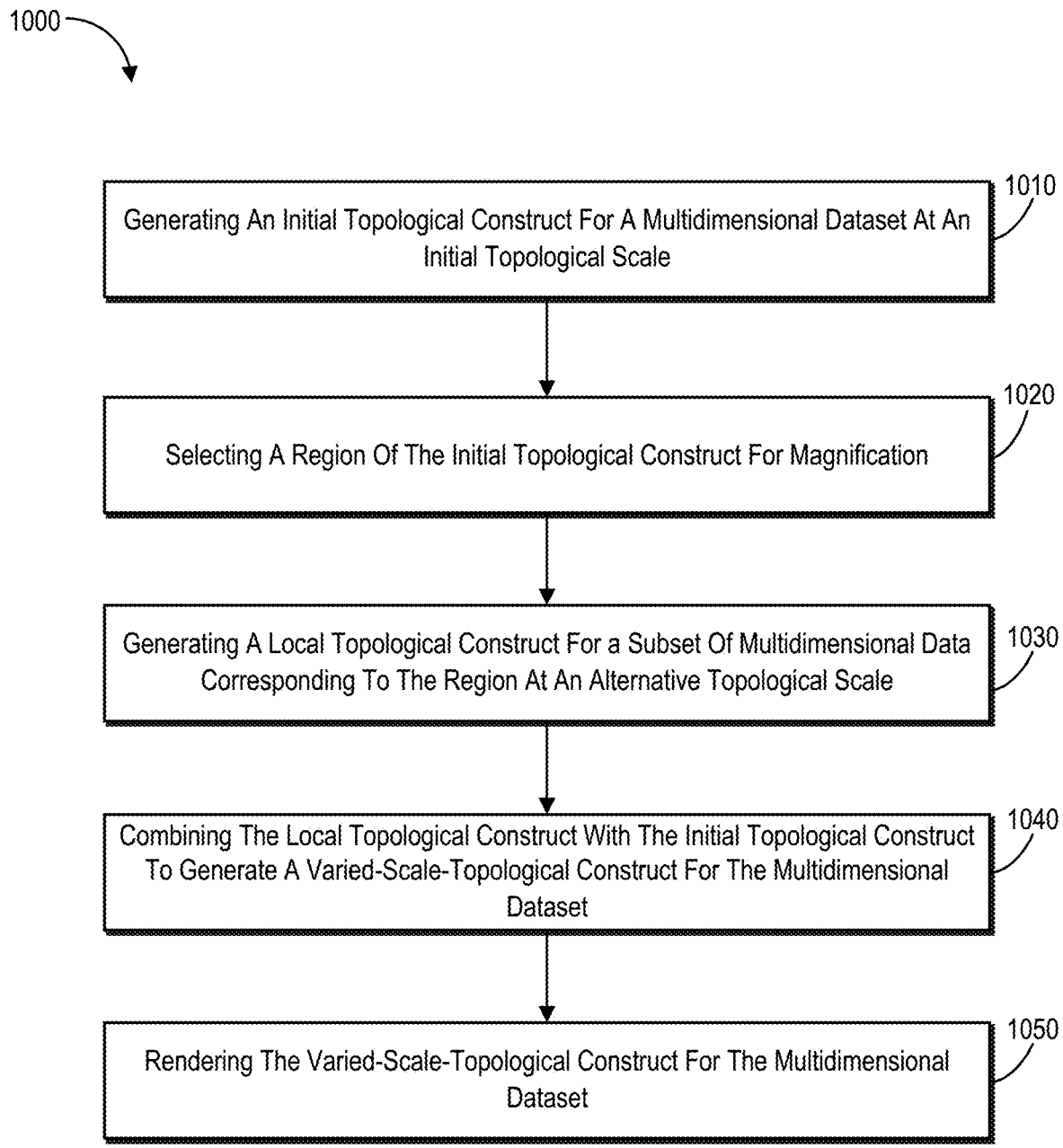
FIG. 10 illustrates a flowchart of a series of acts for generating and rendering a varied-scale-topological construct for a multidimensional dataset in accordance with one or more embodiments.

Turning now to FIG. 10, this figure illustrates a flowchart of a series of acts 1000 of generating and rendering a varied-scale-topological construct for a multidimensional dataset in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable storage medium can comprise instructions that, when executed by one or more processors, cause a computing device to perform the acts depicted in FIG. 10. In still further embodiments, a system can perform the acts of FIG. 10.

As shown in FIG. 10, the acts 1000 include an act 1010 of generating an initial topological construct for a multidimensional dataset at an initial topological scale. For example, in some embodiments, generating the initial topological construct for the multidimensional dataset comprises applying a Mapper algorithm to generate a nerve of an initial cover for the multidimensional dataset according to a lens function.

As further shown in FIG. 10, the acts 1000 include an act 1020 of selecting a region of the initial topological construct for magnification. For example, in certain embodiments, the act 1020 includes selecting a region of the initial topological construct for magnification, the region corresponding to a subset of multidimensional data from the multidimensional dataset.

As suggested above, in certain implementations, selecting the region of the initial topological construct for magnification comprises: determining that the subset of multidimensional data corresponding to the region is denser than an additional subset of multidimensional data corresponding to an additional region of the initial topological construct; and selecting the region of the initial topological construct for magnification based on a relative density of the subset of multidimensional data compared to the additional subset of multidimensional data. By contrast, in some embodiments, selecting the region of the initial topological construct for magnification comprises: receiving an indication from a client device of a user selection of the region of the initial topological construct; and selecting the region of the initial topological construct for magnification based on the user selection.

By contrast, in some embodiments, selecting the region of the initial topological construct for magnification comprises: identifying an edge connecting nodes within the region of the initial topological construct; generating a plurality of topological constructs corresponding to the edge within the region of the initial topological construct, wherein each topological construct from the plurality of topological constructs comprises a different topological scale; identifying multiple disconnected components corresponding to the edge within the plurality of topological constructs; and based on determining that the multiple disconnected components corresponding to the edge within the plurality of topological constructs indicate a violation of a component-persistence threshold, selecting the region of the initial topological construct corresponding to the edge connecting the nodes for magnification. In some such embodiments, identifying the multiple disconnected components corresponding to the edge within the plurality of topological constructs comprises using a persistence parameter.

As a further example, in some cases, selecting the region of the initial topological construct for magnification comprises: identifying an edge connecting a first node and a second node within the region of the initial topological construct, the first node corresponding to a first grouping of multidimensional data from the subset of multidimensional data and the second node corresponding to a second grouping of multidimensional data from the subset of multidimensional data; applying a clustering algorithm to a shared set of multidimensional data between the first grouping of multidimensional data and the second grouping of multidimensional data to generate a plurality of clusters of multidimensional data corresponding to the edge within the region of the initial topological construct; and based on determining that the plurality of clusters of multidimensional data indicate a contractibility violation, selecting the region of the initial topological construct corresponding to the edge connecting the first node and the second node for magnification.

As further shown in FIG. 10, the acts 1000 include an act 1030 of generating a local topological construct for a subset of multidimensional data corresponding to the region at an alternative topological scale. For example, in certain implementations, the act 1030 includes, based on the selection of the region, generating a local topological construct for the subset of multidimensional data at an alternative topological scale.

As suggested above, in some embodiments, generating the local topological construct for the subset of multidimensional data at the alternative topological scale comprises: generating a local cover for the subset of multidimensional data corresponding to the region of the initial topological construct utilizing a lens function, the local cover comprising a plurality of bins; identifying inverse images corresponding to each bin of the local cover; and generating a set of clusters of multidimensional data for the inverse images corresponding to each bin of the local cover.

As further shown in FIG. 10, the acts 1000 include an act 1040 of combining the local topological construct with the initial topological construct to generate a varied-scale-topological construct for the multidimensional dataset. In particular, in certain implementations, the act 1040 includes combining the local topological construct for the subset of multidimensional data with the initial topological construct for the multidimensional dataset to generate a varied-scale-topological construct for the multidimensional dataset.

For example, in some embodiments, generating the varied-scale-topological construct for the multidimensional dataset comprises: identifying an additional set of clusters of multidimensional data corresponding to an additional subset of multidimensional data; determining simplices for the varied-scale-topological construct corresponding to simultaneous intersections between from the set of clusters and the additional set of clusters; and generating a nerve for a new cover of the multidimensional dataset comprising the simplices corresponding to the simultaneous intersections between from the set of clusters and the additional set of clusters.

As suggested above, in certain implementations, generating the varied-scale-topological construct for the multidimensional dataset comprises generating the varied-scale-topological construct representing a first subset of multidimensional data at an alternative topological scale and a second subset of multidimensional data at the initial topological scale by: identifying a first set of nodes corresponding to the first subset of multidimensional data and a second set of nodes corresponding to the second subset of multidimensional data; and joining the first subset of multidimensional data at the alternative topological scale with the second subset of multidimensional data at the initial topological scale using edges corresponding to intersections between nodes from the first set of nodes and the second set of nodes. Further, in certain implementations, generating the varied-scale-topological construct for the multidimensional dataset comprises generating a nerve for a new cover of the multidimensional dataset comprising the edges corresponding to the intersections between the nodes from the first set of nodes and the second set of nodes.

In some cases, generating the varied-scale-topological construct for the multidimensional dataset comprises: generating a local cover for the first subset of multidimensional data corresponding to the first region of the initial topological construct utilizing a lens function, the local cover comprising a plurality of bins; identifying inverse images corresponding to each bin of the local cover; generating a set of clusters of multidimensional data for the inverse images corresponding to each bin of the local cover; and generating the first set of nodes corresponding to the first subset of multidimensional data based on the set of clusters of multidimensional data.

As further shown in FIG. 10, the acts 1000 include an act 1050 of rendering the varied-scale-topological construct for the multidimensional dataset. For example, in some embodiments, rendering the varied-scale-topological construct comprises rendering a topological visualization for the varied-scale-topological construct for the multidimensional dataset, wherein the topological visualization comprises: the first set of nodes representing the set of clusters of multidimensional data; and the second set of nodes representing an additional set of clusters of multidimensional data.

In addition to the acts 1010-1050, in some cases, the acts 1000 further include identifying user input from a client device requesting a topological visualization of the multidimensional dataset; and based on the user input requesting the topological visualization of the multidimensional dataset, rendering the varied-scale-topological construct within a graphical user interface of the client device.

As suggested above, in certain implementations, the topological data visualization system 106 selects an alternative topological scale. For example, in some cases, the acts 1000 further include identifying a topological scale at which a topological construct for the subset of multidimensional data demonstrates contractibility; and selecting the topological scale as the alternative topological scale for the local topological construct corresponding to the region. By contrast, in certain embodiments, the acts 1000 further include identifying a topological scale at which a topological construct for the subset of multidimensional data satisfies the component-persistence threshold; and selecting the topological scale as the alternative topological scale for the local topological construct corresponding to the region.

Additionally, in some cases, the acts 1000 further include generating the initial topological construct for the multidimensional dataset at the initial topological scale in part by projecting the multidimensional dataset into an initial lower-dimensional-image space utilizing a lens function; and generating the local topological construct for the subset of multidimensional data at the alternative topological scale by: projecting the subset of multidimensional data corresponding to the region into a local lower-dimensional-image space utilizing the lens function; partitioning the initial lower-dimensional-image space into bin sections corresponding to the local lower-dimensional-image space; and generating the local topological construct based on a local cover for the subset of multidimensional data corresponding to the bin sections.

Similarly, in some embodiments, generating the local topological construct for the subset of multidimensional data at the alternative topological scale comprises: projecting the subset of multidimensional data corresponding to the region into a local lower-dimensional-image space utilizing the lens function; partitioning an initial lower-dimensional-image space for the multidimensional dataset into bin sections corresponding to the local lower-dimensional-image space; and generating the local topological construct based on a local cover for the subset of multidimensional data corresponding to the bin sections.

As further suggested above, in certain implementations, the acts 1000 include selecting an additional region of the initial topological construct for magnification, the additional region corresponding to an additional subset of multidimensional data from the multidimensional dataset; based on the selection of the additional region, generating an additional local topological construct for the additional subset of multidimensional data at an additional alternative topological scale; and combining the additional local topological construct for the additional subset of multidimensional data, the local topological construct for the subset of multidimensional data, and the initial topological construct for the multidimensional dataset to generate the varied-scale-topological construct for the multidimensional dataset.

Further, in some embodiments, the acts 1000 include generating a first set of clusters of multidimensional data for inverse images corresponding to each bin of a first local cover for the first subset of multidimensional data; generating the first set of nodes corresponding to the first subset of multidimensional data based on first the set of clusters of multidimensional data; generating a second set of clusters of multidimensional data for inverse images corresponding to each bin of a second local cover for the second subset of multidimensional data; generating the second set of nodes corresponding to the second subset of multidimensional data based on the second set of clusters of multidimensional data; and rendering a topological visualization for the varied-scale-topological construct for the multidimensional dataset, wherein the topological visualization comprises: the first set of nodes representing the first set of clusters of multidimensional data; and the second set of nodes representing the second set of clusters of multidimensional data.

In addition (or in the alternative) to the acts describe above, in some embodiments, the acts 1000 include a step for varying topological scales of the first region and the second region of the initial topological construct to produce a varied-scale-topological construct for the multidimensional dataset. For instance, the algorithms and acts described in reference to FIG. 3 for generating the varied-scale-topological construct 308 or FIG. 5 for generating the varied-scale-topological construct 508 can comprise the corresponding acts for performing a step for varying topological scales of the first region and the second region of the initial topological construct to produce a varied-scale-topological construct for the multidimensional dataset.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 11:
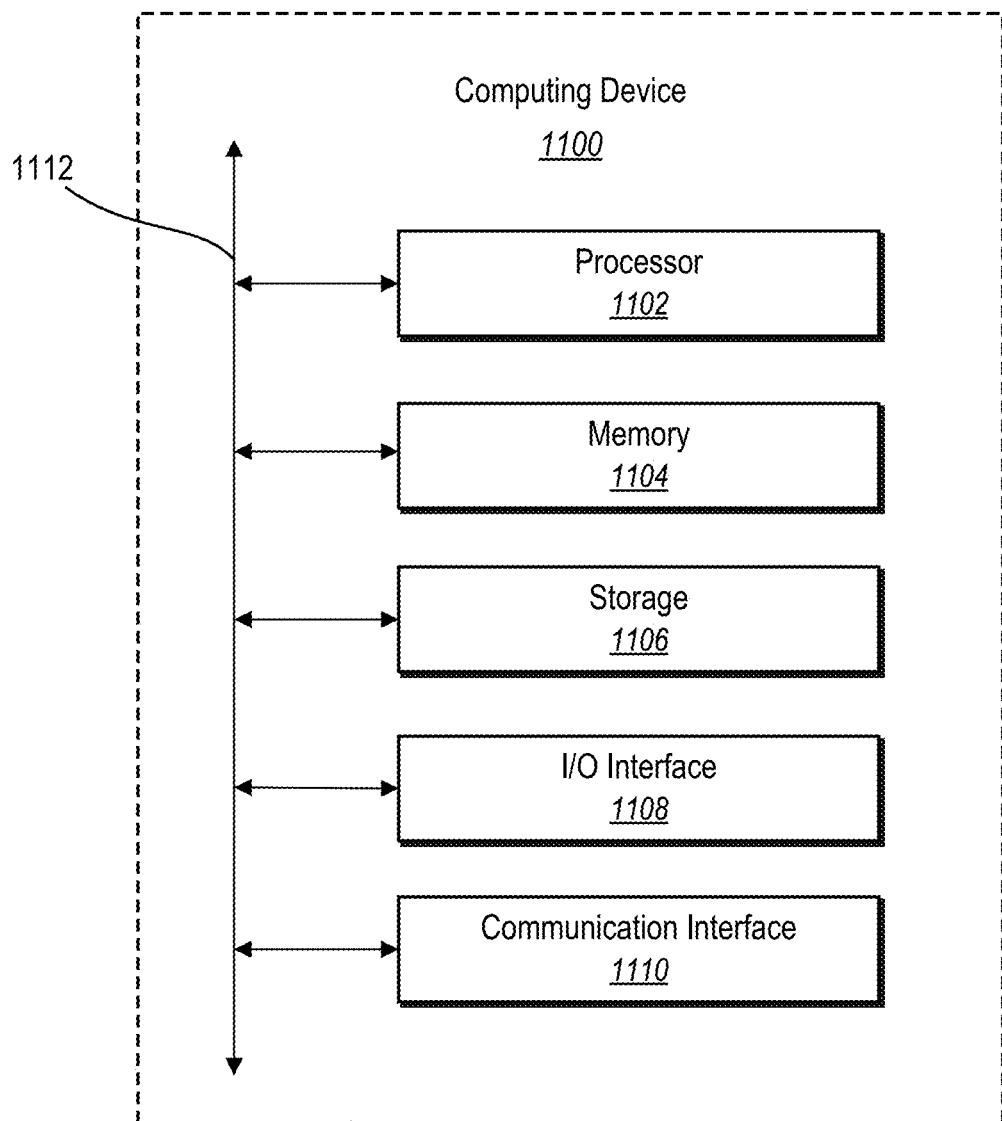
FIG. 11 illustrates a block diagram of an exemplary computing device for implementing one or more embodiments of the present disclosure.

FIG. 11 illustrates a block diagram of exemplary computing device 1100 that may be configured to perform one or more of the processes described above. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. In certain embodiments, the computing device 1100 can include fewer or more components than those shown in FIG. 11. Components of the computing device 1100 shown in FIG. 11 will now be described in additional detail.

In one or more embodiments, the processor 1102 includes hardware for executing instructions, such as those making up a computer program. As an example, and not by way of limitation, to execute instructions for digitizing real-world objects, the processor 1102 may retrieve (or fetch) the instructions from an internal register, an internal cache, the memory 1104, or the storage device 1106 and decode and execute them. The memory 1104 may be a volatile or non-volatile memory used for storing data, metadata, and programs for execution by the processor(s). The storage device 1106 includes storage, such as a hard disk, flash disk drive, or other digital storage device, for storing data or instructions related to object digitizing processes (e.g., digital scans, digital models).

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example and not by way of limitation, the communication interface 1110 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 1110 may facilitate communications with various types of wired or wireless networks. The communication interface 1110 may also facilitate communications using various communication protocols. The communication infrastructure 1112 may also include hardware, software, or both that couples components of the computing device 1100 to each other. For example, the communication interface 1110 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. In a digital medium environment for visualizing datasets, a computer-implemented method for varying topological scales in topological visualizations of multidimensional datasets comprising:
    generating an initial topological construct for a multidimensional dataset at an initial topological scale, the initial topological construct comprising a first region corresponding to a first subset of multidimensional data corresponding to a first subset of nodes and a second region corresponding to a second subset of multidimensional data corresponding to a second subset of nodes;
    generating a plurality of topological constructs, each corresponding to an alternative topological scale of an edge within the first region;
    selecting the first region of the initial topological construct for magnification by determining that a persistence parameter violates a component-persistence threshold, wherein the persistence parameter identifies a number of disconnected components corresponding to the edge within the first region within each of the plurality of topological constructs;
    determining an alternative topological scale for the first region based on a persistence of a structure within the first region by determining that the persistence parameter corresponding to the edge within the first region at the alternative topological scale satisfies the component-persistence threshold;
    generating a local topological construct for the first subset of nodes of the first region at the alternative topological scale;
    combining the first region and the second region by generating edges, corresponding to intersections, between nodes from the first subset of nodes at the alternative topological scale and nodes from the second subset of nodes at the initial topological scale to produce a varied-scale-topological construct for the multidimensional dataset; and
    rendering the varied-scale-topological construct for the multidimensional dataset.

2. The computer-implemented method of claim 1, wherein generating the initial topological construct for the multidimensional dataset comprises applying a Mapper algorithm to generate a nerve of an initial cover for the multidimensional dataset according to a lens function.

3. The computer-implemented method of claim 1, further comprising:
    selecting the first region of the initial topological construct for magnification based on the first subset of multidimensional data having a higher relative density when compared to the second subset of multidimensional data.

4. The computer-implemented method of claim 1, wherein selecting the first region of the initial topological construct for magnification comprises:
    receiving an indication from a client device of a user selection of the first region of the initial topological construct; and
    selecting the first region of the initial topological construct for magnification based on the user selection.

5. The computer-implemented method of claim 1, further comprising:
    identifying user input from a client device requesting a topological visualization of the multidimensional dataset; and
    based on the user input requesting the topological visualization of the multidimensional dataset, rendering the varied-scale-topological construct within a graphical user interface of the client device.

6. A non-transitory computer readable medium storing instructions thereon that, when executed by at least one processor, cause the at least one processor to:
    generate an initial topological construct for a multidimensional dataset at an initial topological scale, the initial topological construct comprising a first region corresponding to a first subset of multidimensional data corresponding to a first subset of nodes and a second region corresponding to a second subset of multidimensional data corresponding to a second subset of nodes;
    generate a plurality of topological constructs, each corresponding to an alternative topological scale of an edge within the first region;
    select the first region of the initial topological construct for magnification by determining that a persistence parameter violates a component-persistence threshold, wherein the persistence parameter identifies a number of disconnected components corresponding to the edge within the first region within each of the plurality of topological constructs;
    determine an alternative topological scale for the first region based on a persistence of a structure within the first region by determining that the persistence parameter corresponding to the edge within the first region at the alternative topological scale satisfies the component-persistence threshold;
    generate a local topological construct for the first subset of multidimensional data at the alternative topological scale;
    combine the first region and the second region by generating edges, corresponding to intersections, between nodes from the first subset of nodes at the alternative topological scale and nodes from the second subset of nodes at the initial topological scale to produce a varied-scale-topological construct for the multidimensional dataset; and
    render the varied-scale-topological construct for the multidimensional dataset.

7. The non-transitory computer readable medium of claim 6, further comprising instructions that, when executed by the at least one processor, cause the at least one processor to select the first region of the initial topological construct for magnification, without user selection of the first region for magnification, by:
    identifying an edge connecting a first node and a second node within the first region of the initial topological construct, the first node corresponding to a first grouping of multidimensional data from the first subset of multidimensional data and the second node corresponding to a second grouping of multidimensional data from the first subset of multidimensional data;

applying a clustering algorithm to a shared set of multidimensional data between the first grouping of multidimensional data and the second grouping of multidimensional data to generate a plurality of clusters of multidimensional data corresponding to the edge within the first region of the initial topological construct; and based on determining that the plurality of clusters of multidimensional data indicate a violation of the component-persistence threshold, selecting the first region of the initial topological construct corresponding to the edge connecting the first node and the second node for magnification.

8. The non-transitory computer readable medium of claim 7, further comprising instructions that, when executed by the at least one processor, cause the at least one processor to:

identify a topological scale at which a topological construct for the first subset of multidimensional data satisfies the component-persistence threshold; and select the topological scale as the alternative topological scale for the local topological construct corresponding to the first region.

9. The non-transitory computer readable medium of claim 6, further comprising instructions that, when executed by the at least one processor, cause the at least one processor to select the first region of the initial topological construct for magnification, without user selection of the first region for magnification, by:

identifying an edge connecting nodes within the first region of the initial topological construct;

generating a plurality of topological constructs corresponding to the edge within the first region of the initial topological construct, wherein each topological construct from the plurality of topological constructs comprises a different topological scale;

identifying instances of the nodes within the plurality of topological constructs; and based on determining that the instances of the nodes within the plurality of topological constructs indicate a violation of the component-persistence threshold, selecting the first region of the initial topological construct corresponding to the edge connecting the nodes for magnification.

10. The non-transitory computer readable medium of claim 9, further comprising instructions that, when executed by the at least one processor, cause the at least one processor to:

identify a topological scale at which a topological construct for the first subset of multidimensional data satisfies the component-persistence threshold; and select the topological scale as the alternative topological scale for the local topological construct corresponding to the first region.

11. The non-transitory computer readable medium of claim 6, further comprising instructions that, when executed by the at least one processor, cause the at least one processor to generate the local topological construct for the first subset of multidimensional data at the alternative topological scale by:

projecting the first subset of multidimensional data corresponding to the first region into a local lower-dimensional-image space utilizing a lens function;

partitioning an initial lower-dimensional-image space for the multidimensional dataset into bin sections corresponding to the local lower-dimensional-image space; and generating the local topological construct based on a local cover for the first subset of multidimensional data corresponding to the bin sections.

12. The non-transitory computer readable medium of claim 6, further comprising instructions that, when executed by the at least one processor, cause the at least one processor to generate the local topological construct for the first subset of multidimensional data at the alternative topological scale by:

generating a local cover for the first subset of multidimensional data corresponding to the first region of the initial topological construct utilizing a lens function, the local cover comprising a plurality of bins;

identifying inverse images corresponding to each bin of the local cover; and generating a set of clusters of multidimensional data for the inverse images corresponding to each bin of the local cover.

13. The non-transitory computer readable medium of claim 12, further comprising instructions that, when executed by the at least one processor, cause the at least one processor to generate the varied-scale-topological construct for the multidimensional dataset by:

identifying an additional set of clusters of multidimensional data corresponding to an additional sub set of multidimensional data;

determining simplices for the varied-scale-topological construct corresponding to simultaneous intersections between the set of clusters and the additional set of clusters; and generating a nerve for a new cover of the multidimensional dataset comprising the simplices corresponding to the simultaneous intersections between the set of clusters and the additional set of clusters.

14. A system comprising:

at least one processor;

at least one non-transitory computer readable medium comprising a multidimensional dataset and instructions that, when executed by the at least one processor, cause the system to:

generate an initial topological construct for the multidimensional dataset at an initial topological scale, the initial topological construct comprising a first region corresponding to a first subset of multidimensional data corresponding to a first subset of nodes and a second region corresponding to a second subset of multidimensional data corresponding to a second subset of nodes;

generate a plurality of topological constructs, each corresponding to an alternative topological scale of an edge within the first region;

select the first region of the initial topological construct for magnification by determining that a persistence parameter violates a component-persistence threshold, wherein the persistence parameter identifies a number of disconnected components corresponding to the edge within the first region within each of the plurality of topological constructs;

determining an alternative topological scale for the first region based on a persistence of a structure within the first region by determining that the persistence parameter corresponding to the edge within the first region at the alternative topological scale satisfies the component-persistence threshold;

generating a local topological construct for the first subset of nodes of the first region at the alternative topological scale;

combining the first region and the second region by generating edges, corresponding to intersections, between nodes from the first subset of nodes at the alternative topological scale and nodes from the second subset of nodes at the initial topological scale to produce a varied-scale-topological construct for the multidimensional dataset; and render the varied-scale-topological construct for the multidimensional dataset.

15. The system of claim 14, further comprising instructions that, when executed by the at least one processor, cause the system to select the first region of the initial topological construct for magnification, without user selection of the first region for magnification, by:

identifying an edge connecting a first node and a second node within the first region of the initial topological construct, the first node corresponding to a first grouping of multidimensional data from the first subset of multidimensional data and the second node corresponding to a second grouping of multidimensional data from the first subset of multidimensional data;

applying a clustering algorithm to a shared set of multidimensional data between the first grouping of multidimensional data and the second grouping of multidimensional data to generate a plurality of clusters of multidimensional data corresponding to the edge within the first region of the initial topological construct; and based on determining that the plurality of clusters of multidimensional data indicate a violation of the component-persistence threshold, selecting the first region of the initial topological construct corresponding to the edge connecting the first node and the second node for magnification.

16. The system of claim 14, further comprising instructions that, when executed by the at least one processor, cause the system to select the first region of the initial topological construct for magnification, without user selection of the first region for magnification, by:

identifying an edge connecting nodes within the first region of the initial topological construct;

generating a plurality of topological constructs corresponding to the edge within the first region of the initial topological construct, wherein each topological construct from the plurality of topological constructs comprises a different topological scale;

identifying multiple disconnected components corresponding to the edge within the plurality of topological constructs; and based on determining that the multiple disconnected components corresponding to the edge within the plurality of topological constructs indicate a violation of the component-persistence threshold, selecting the first region of the initial topological construct corresponding to the edge connecting the nodes for magnification.

17. The system of claim 16, further comprising instructions that, when executed by the at least one processor, cause the system to identify the multiple disconnected components corresponding to the edge within the plurality of topological constructs by using a persistence parameter.

18. The system of claim 14, further comprising instructions that, when executed by the at least one processor, cause the system to:

determine that the first subset of multidimensional data corresponding to the first region is denser than the second subset of multidimensional data corresponding to the second region; and select the first region of the initial topological construct for magnification based on a relative density of the first subset of multidimensional data compared to the second subset of multidimensional data.

19. The system of claim 14, further comprising instructions that, when executed by the at least one processor, cause the system to:

generate a first set of clusters of multidimensional data for inverse images corresponding to each bin of a first local cover for the first subset of multidimensional data;

generate the first subset of nodes corresponding to the first subset of multidimensional data based on the first set of clusters of multidimensional data;

generate a second set of clusters of multidimensional data for inverse images corresponding to each bin of a second local cover for the second subset of multidimensional data;

generate the second subset of nodes corresponding to the second subset of multidimensional data based on the second set of clusters of multidimensional data; and render a topological visualization for the varied-scale-topological construct for the multidimensional dataset, wherein the topological visualization comprises:

the first subset of nodes representing the first set of clusters of multidimensional data; and the second subset of nodes representing the second set of clusters of multidimensional data.

20. The system of claim 14, further comprising instructions that, when executed by the at least one processor, cause the system to generate the varied-scale-topological construct for the multidimensional dataset in part by generating a nerve for a new cover of the multidimensional dataset comprising the edges corresponding to the intersections between the nodes from the first subset of nodes and the second subset of nodes.

* * * * *